(12) United States Patent
Abe

(10) Patent No.: US 10,412,321 B2
(45) Date of Patent: Sep. 10, 2019

(54) IMAGING APPARATUS AND IMAGE SYNTHESIS METHOD

(71) Applicant: Panasonic Intellectual Property Management Co., Ltd., Osaka (JP)

(72) Inventor: Mitsuo Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/801,082

(22) Filed: Nov. 1, 2017

(65) Prior Publication Data

US 2018/0167565 A1 Jun. 14, 2018

(30) Foreign Application Priority Data

Dec. 12, 2016 (JP) .................................. 2016-240449
Jul. 25, 2017 (JP) .................................. 2017-143357

(51) Int. Cl.
| | |
|---|---|
| *H04N 5/232* | (2006.01) |
| *H04N 5/272* | (2006.01) |
| *G06T 7/571* | (2017.01) |
| *G06T 7/11* | (2017.01) |
| *G06T 5/50* | (2006.01) |
| *H04N 5/202* | (2006.01) |

(52) U.S. Cl.
CPC ............... *H04N 5/272* (2013.01); *G06T 5/50* (2013.01); *G06T 7/11* (2017.01); *G06T 7/571* (2017.01); *H04N 5/23212* (2013.01); *H04N 5/23229* (2013.01); *H04N 5/232123* (2018.08); *G06T 2207/10148* (2013.01); *G06T 2207/20221* (2013.01)

(58) Field of Classification Search
CPC ............... H04N 5/272; H04N 5/23229; H04N 5/232123; H04N 5/23212; G06T 5/50; G06T 7/11; G06T 7/571; G06T 2207/10148; G06T 2207/20221
See application file for complete search history.

(56) References Cited

U.S. PATENT DOCUMENTS

2011/0181911 A1* 7/2011 Kojima .................... G06T 11/60
                                                          358/1.15
2011/0286639 A1* 11/2011 Ramrattan ......... G06K 9/00033
                                                          382/124

(Continued)

FOREIGN PATENT DOCUMENTS

JP          2014-207502         10/2014

*Primary Examiner* — Hung H Lam
(74) *Attorney, Agent, or Firm* — Renner, Otto, Boisselle & Sklar, LLP

(57) ABSTRACT

Imaging apparatus includes imaging unit that captures a subject image while changing an in-focus position to generate a plurality of pieces of image data, image processor that synthesizes the plurality of pieces of image data generated by the imaging unit to generate still image data having a deeper depth of field than a depth of field of each of the plurality of pieces of image data, and controller that controls the image processor. Controller causes image processor to detect a main subject from an image indicated by one image data in the plurality of pieces of image data, determine a range for synthesizing the plurality of pieces of image data based on a position of the detected main subject, and synthesize pieces of image data focused within the determined range to generate the still image data.

10 Claims, 21 Drawing Sheets

(56) References Cited

U.S. PATENT DOCUMENTS

| | | | | |
|---|---|---|---|---|
| 2014/0334681 A1* | 11/2014 | Kinoshita | .......... | H04N 5/23219 |
| | | | | 382/103 |
| 2016/0028948 A1 | 1/2016 | Omori et al. | | |
| 2016/0142618 A1* | 5/2016 | Tokui | ....................... | G02B 7/36 |
| | | | | 348/349 |
| 2017/0223250 A1* | 8/2017 | Ajito | .................. | H04N 5/23212 |

* cited by examiner

FIG. 7A

IN-FOCUS INFORMATION TABLE 60

| | IN-FOCUS LENS POSITION CLOSEST TO NEAREST END (Pnear) | IN-FOCUS LENS POSITION CLOSEST TO INFINITY END (Pfar) |
|---|---|---|
| a | 100 | 3800 |

FIG. 7B

IN-FOCUS INFORMATION TABLE 61

| | FIRST AF REGION | SECOND AF REGION | THIRD AF REGION | ... | 19TH AF REGION | ... | 49TH AF REGION |
|---|---|---|---|---|---|---|---|
| b | FRAME NUMBER | 100 | 95 | 36 | ... | 50 | ... | 1 |
| c | FOCUS LENS POSITION (IN-FOCUS POSITION) | 3800 | 3000 | 2800 | ... | P | ... | 100 |

FIG. 13

SUBJECT DETERMINING INFORMATION TABLE 70

| FOCUS LENS POSITION (IN-FOCUS POSITION) | 100 | 103 | 105 | 107 | 110 | 112 | 112 | 150 | 400 | 425 | 430 | 440 | 440 | 440 | 450 | 450 | 450 | 450 | 450 | 450 | 460 | 470 | 470 | 470 |
|---|---|---|---|---|---|---|---|---|---|---|---|---|---|---|---|---|---|---|---|---|---|---|---|---|
| AF REGION NUMBER | 49 | 42 | 48 | 47 | 41 | 35 | 40 | 34 | 18 | 25 | 11 | 17 | 19 | 32 | 10 | 12 | 24 | 26 | 31 | 33 | 45 | 39 | 4 | 38 | 46 |
| SUBJECT NUMBER | 1 | 1 | 1 | 1 | 1 | 1 | 2 | 2 | 3 | 3 | 3 | 3 | 3 | 3 | 3 | 3 | 3 | 3 | 3 | 3 | 3 | 3 | 3 | 3 | 3 |
| IMPORTANCE | 1 | 2 | 2 | 3 | 3 | 3 | 4 | 4 | 8 | 10 | 6 | 6 | 6 | 8 | 4 | 4 | 8 | 8 | 6 | 6 | 3 | 6 | 4 | 4 | 4 |

| FOCUS LENS POSITION (IN-FOCUS POSITION) | 625 | 630 | 640 | 800 | 820 | 830 | 840 | 840 | 850 | 870 | 880 | 1500 | 1700 | 1800 | 1800 | 2000 | 2000 | 2100 | 2800 | 2800 | 3000 | 3000 | 3800 |
|---|---|---|---|---|---|---|---|---|---|---|---|---|---|---|---|---|---|---|---|---|---|---|---|
| AF REGION NUMBER | 36 | 43 | 29 | 16 | 37 | 39 | 15 | 23 | 44 | 22 | 8 | 9 | 21 | 5 | 14 | 27 | 7 | 28 | 20 | 3 | 13 | 2 | 6 | 1 |
| SUBJECT NUMBER | 4 | 4 | 4 | 5 | 5 | 5 | 5 | 5 | 5 | 5 | 5 | 5 | 6 | 6 | 6 | 6 | 6 | 6 | 6 | 7 | 7 | 7 | 7 | 8 |
| IMPORTANCE | 2 | 1 | 3 | 4 | 3 | 4 | 3 | 6 | 2 | 5 | 2 | 3 | 3 | 3 | 2 | 6 | 1 | 4 | 4 | 3 | 3 | 2 | 2 | 1 |

FIG. 14

DETERMINING THRESHOLD TABLE

| FOCUS LENS POSITION (IN-FOCUS POSITION) | DETERMINING THRESHOLD |
|---|---|
| 0 TO LESS THAN 100 | 10 |
| 100 TO LESS THAN 200 | 20 |
| 200 TO LESS THAN 300 | 30 |
| 300 TO LESS THAN 400 | 40 |
| 400 TO LESS THAN 600 | 70 |
| 600 TO LESS THAN 800 | 100 |
| 800 TO LESS THAN 1000 | 300 |
| 1000 TO LESS THAN 2000 | 600 |
| 2000 TO LESS THAN 3000 | 900 |
| 3000 TO LESS THAN 4000 | 1500 |

FIG. 15A

| 1 | 2 | 3 | 4 | 3 | 2 | 1 |
|---|---|---|---|---|---|---|
| 2 | 3 | 4 | 6 | 4 | 3 | 2 |
| 3 | 4 | 6 | 8 | 6 | 4 | 3 |
| 4 | 6 | 8 | 10 | 8 | 6 | 4 |
| 3 | 4 | 6 | 8 | 6 | 4 | 3 |
| 2 | 3 | 4 | 6 | 4 | 3 | 2 |
| 1 | 2 | 3 | 4 | 3 | 2 | 1 |

FIG. 15B

WEIGHT TABLE 74

| | FIRST AF REGION | SECOND AF REGION | THIRD AF REGION | ... | 19TH AF REGION | ... | 25TH AF REGION | ... | 49TH AF REGION |
|---|---|---|---|---|---|---|---|---|---|
| WEIGHT | 1 | 2 | 3 | ... | 6 | ... | 10 | ... | 1 |

FIG. 18

SUBJECT IMPORTANCE TABLE

| SUBJECT NUMBER | ACCUMULATED IMPORTANCE |
|---|---|
| 1 | 18 |
| 2 | 4 |
| 3 | 101 |
| 4 | 6 |
| 5 | 31 |
| 6 | 23 |
| 7 | 12 |
| 8 | 1 |

SUBJECT DETERMINING INFORMATION TABLE

| FOCUS LENS POSITION (IN-FOCUS POSITION) | 100 | 103 | 105 | 107 | 110 | 112 | 112 | 150 | 400 | 425 | 430 | 440 | 440 | 440 | 450 | 450 | 450 | 450 | 450 | 450 | 450 | 450 | 460 | 470 | 470 | 470 |
|---|---|---|---|---|---|---|---|---|---|---|---|---|---|---|---|---|---|---|---|---|---|---|---|---|---|---|
| AF REGION NUMBER | 49 | 42 | 48 | 47 | 41 | 35 | 40 | 34 | 18 | 25 | 11 | 17 | 19 | 32 | 10 | 12 | 24 | 26 | 31 | 33 | 45 | 39 | 4 | 38 | 46 |
| SUBJECT NUMBER | 1 | 1 | 1 | 1 | 1 | 1 | 1 | 2 | 3 | 3 | 3 | 3 | 3 | 3 | 3 | 3 | 3 | 3 | 3 | 3 | 3 | 3 | 3 | 3 | 3 |
| IMPORTANCE | 1 | 2 | 2 | 3 | 3 | 3 | 4 | 4 | 8 | 10 | 6 | 6 | 6 | 8 | 4 | 4 | 8 | 8 | 6 | 6 | 3 | 6 | 4 | 4 | 4 |

START POINT (140) −300 CENTER (440) +300

| FOCUS LENS POSITION (IN-FOCUS POSITION) | 625 | 630 | 640 | 800 | 820 | 830 | 840 | 840 | 850 | 870 | 880 | 1500 | 1700 | 1800 | 1800 | 2000 | 2000 | 2100 | 2800 | 2800 | 3000 | 3000 | 3800 |
|---|---|---|---|---|---|---|---|---|---|---|---|---|---|---|---|---|---|---|---|---|---|---|---|
| AF REGION NUMBER | 36 | 43 | 29 | 16 | 37 | 39 | 15 | 23 | 44 | 22 | 8 | 9 | 21 | 5 | 14 | 27 | 7 | 28 | 20 | 3 | 13 | 2 | 2 | 6 | 1 |
| SUBJECT NUMBER | 4 | 4 | 4 | 5 | 5 | 5 | 5 | 5 | 5 | 5 | 5 | 6 | 6 | 6 | 6 | 6 | 6 | 6 | 6 | 7 | 7 | 7 | 7 | 8 |
| IMPORTANCE | 2 | 1 | 3 | 4 | 3 | 4 | 3 | 6 | 2 | 4 | 2 | 3 | 3 | 3 | 2 | 6 | 3 | 4 | 4 | 3 | 3 | 2 | 2 | 1 |

END POINT (740)

IMAGING APPARATUS AND IMAGE SYNTHESIS METHOD

BACKGROUND

1. Technical Field

The present disclosure relates to an imaging apparatus and an image synthesis method having a function for synthesizing a plurality of images to generate an image having a deep depth of field.

2. Description of the Related Art

Unexamined Japanese Patent Publication No. 2014-207502 discloses an imaging apparatus that captures a plurality of images of varying focuses, and generates an image of a depth of field enlarged based on the captured images. An operator selects a plurality of subjects that is desired to be focused, and the imaging apparatus according to Unexamined Japanese Patent Publication No. 2014-207502 captures images based on in-focus positions of the subjects selected by the operator. Consequently, it is possible to obtain a synthesis image matching the operator's intention by combining these images.

SUMMARY

An imaging apparatus of one aspect of the present disclosure includes an imaging unit that captures a subject image while changing an in-focus position to generate a plurality of pieces of image data, an image processor that synthesizes the plurality of pieces of image data generated by the imaging unit to generate still image data having a deeper depth of field than a depth of field of each of the plurality of pieces of image data, and a controller that controls the image processor. The controller causes the image processor to detect a main subject from an image indicated by one image data in the plurality of pieces of image data, determine a range for synthesizing the plurality of pieces of image data based on a position of the detected main subject, and synthesize pieces of image data focused within the determined range in the plurality of pieces of image data to generate the still image data.

An image synthesis method that is another aspect of the present disclosure includes synthesizing the plurality of pieces of image data to generate the still image data such that a depth of field of the main subject in the still image data is deeper than a depth of field of the main subject in each of the plurality of pieces of image data. In the image synthesis method, in each image in the plurality of pieces of image data, in a case where a first subject and a second subject are included, when areas of the first subject and the second subject in the image are different from each other, in-focus positions of the first subject and the second subject are different from each other, and center positions of the first subject and the second subject in the image are equal to each other, one of the first subject and the second subject having a larger area is set as the main subject. Further, in the image synthesis method, when the areas of the first subject and the second subject in the image are equal to each other, the in-focus positions of the first subject and the second subject are different from each other, and the center positions of the first subject and the second subject in the image are different from each other, one of the first subject and the second subject closer to a center of the image is set as the main subject.

According to the imaging apparatus and the image synthesis method, a main subject is detected from an image, a synthesis range is determined based on a position of the main subject, and a plurality of pieces of image data focused within the determined synthesis range are synthesized to obtain an image of a deep depth of field.

BRIEF DESCRIPTION OF THE DRAWINGS

FIG. 7A is a view illustrating an example of an in-focus information table;

FIG. 7B is a view illustrating an example of the in-focus information table;

FIG. 13 is a view illustrating an example of a subject determining information table;

FIG. 14 is a view illustrating an example of a determining threshold table;

FIG. 15A is a view illustrating a setting example of a weight for each AF region;

FIG. 15B is a view illustrating an example of a weight table;

FIG. 18 is a view illustrating an example of a subject importance table;

FIG. 20 is a view illustrating a specific example of the calculation processing of the depth synthesis range;

DETAILED DESCRIPTION

Hereinafter, exemplary embodiments will be described in detail with reference to the drawings as appropriate. However, descriptions in more detail than necessary may be omitted. For example, a detailed description of a matter which is already well-known, or an overlapped description for a substantially identical configuration may be omitted. This is intended to prevent the following description from becoming unnecessarily redundant and to facilitate understanding of those skilled in the art. Note that the attached drawings and the following description are provided for those skilled in the art to fully understand the present disclosure, and are not intended to limit the subject matter as described in the appended claims.

The exemplary embodiments of an imaging apparatus of the present disclosure will be described below.

First Exemplary Embodiment

1. Configuration

Figure 1:
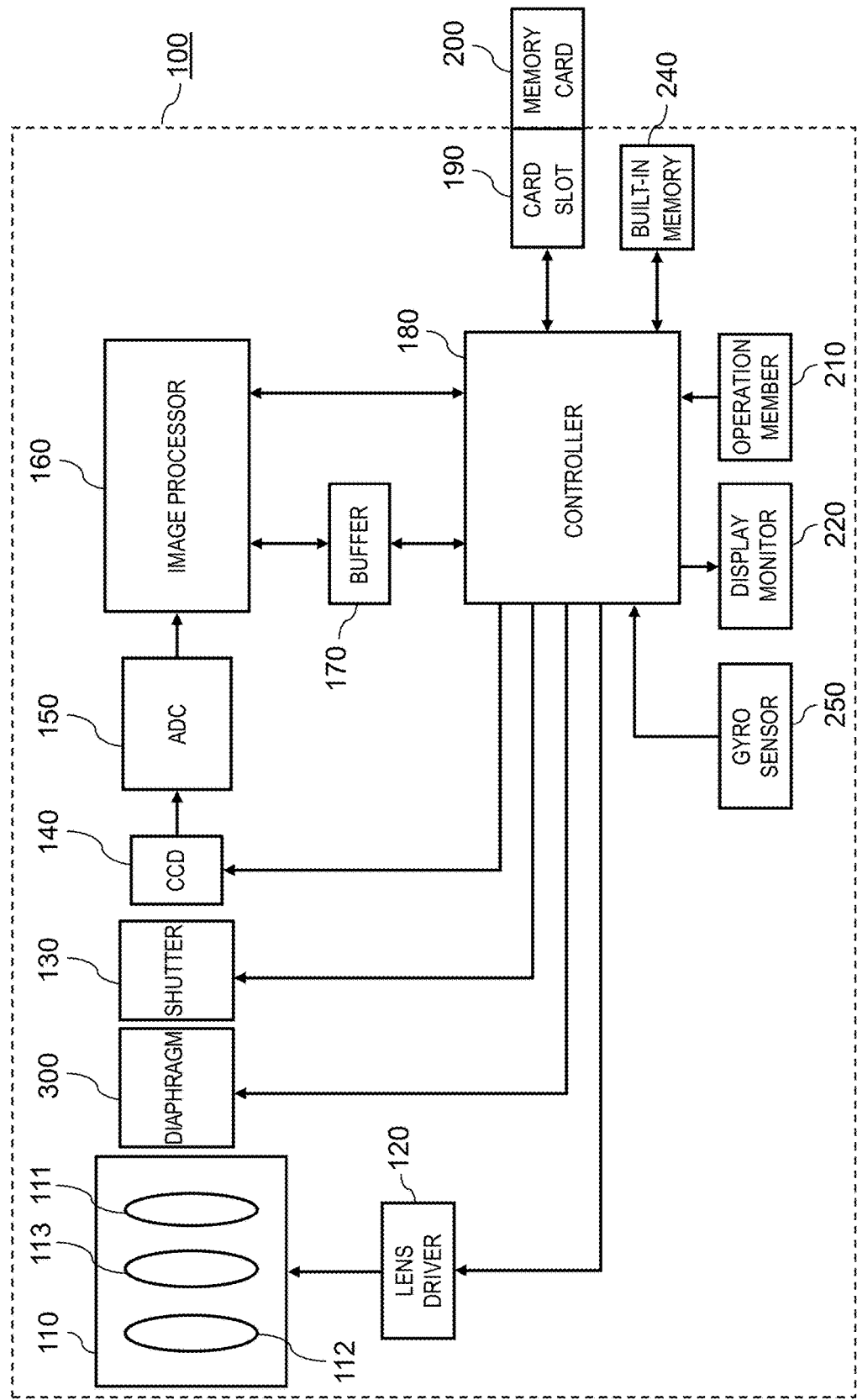
FIG. 1 is a view illustrating a configuration of a digital camera according to the present disclosure.

An electrical configuration of a digital camera (an example of an imaging apparatus) according to a first exemplary embodiment will be described with reference to FIG. 1. FIG. 1 is a block diagram illustrating a configuration of digital camera 100. Digital camera 100 is an imaging apparatus that captures a subject image formed by optical system 110 including one or a plurality of lenses by using charge coupled device (CCD) 140 as an imaging unit. Image data generated by CCD 140 is subjected to various types of processing by image processor 160 and is then stored in memory card 200. The configuration of digital camera 100 will be described in detail below.

Optical system 110 includes focus lens 111, zoom lens 112, and camera shake correction lens 113. By moving zoom lens 112 along an optical axis, it is possible to enlarge or reduce the subject image. Furthermore, by moving focus lens 111 along the optical axis, it is possible to adjust a focus (in-focus state) on the subject image. Still further, camera shake correction lens 113 corrects blurring of an image caused by shake of digital camera 100.

Lens driver 120 drives various lenses (e.g., zoom lens 112 and focus lens 111) included in optical system 110. Lens driver 120 includes, for example, a zoom motor that drives zoom lens 112 and a focus motor that drives focus lens 111.

Diaphragm 300 adjusts a size of an aperture according to a user's setting or automatically to thereby adjust an amount of light transmitting through the aperture.

Shutter 130 is a unit for shielding light to be transmitted to CCD 140. Shutter 130 controls optical information indicating the subject image with optical system 110 and diaphragm 300. Further, optical system 110 and diaphragm 300 are housed in a lens barrel.

CCD 140 captures the subject image formed by optical system 110, and generates image data. CCD 140 includes a color filter, a light-receiving element, and an auto gain controller (AGC). The light-receiving element converts an optical signal of light collected by optical system 110 into an electrical signal and generates image information. The AGC amplifies the electrical signal output from the light-receiving element.

Analog-digital converter (A/D converter: ADC) 150 converts analog image data generated by CCD 140 into digital image data.

Based on control of controller 180, image processor 160 performs various types of processing on the digital image data generated by CCD 140 and converted. Image processor 160 generates image data to be displayed on display monitor 220 and generates image data to be stored in memory card 200. For example, image processor 160 performs various types of processing such as Gamma correction, white balance correction, and damage correction, on the image data generated by CCD 140. Furthermore, image processor 160 compresses the image data generated by CCD 140 according to a compression format that complies with H.264 standards or MPEG2 standards. Furthermore, image processor 160 can generate, for example, image data (4K moving image data) of a moving image of approximately 4000×2000 pixels based on the image data generated by CCD 140. Image processor 160 can perform various types of processing described below on the generated 4K moving image data. For example, image processor 160 performs depth synthesis (focus stacking) processing by using frame images that constitute the generated 4K moving image data (details will be described below).

Controller 180 is a control unit that entirely controls digital camera 100. Controller 180 can be realized by a semiconductor element, for example.

Image processor 160 and controller 180 may be configured by only hardware or may be realized by a combination of hardware and software. Controller 180 can be realized by a micro-controller, a central processing unit (CPU), a micro processing unit (MPU), a digital signal processor (DSP), an application specific integrated circuit (ASIC), a field-programmable gate array (FPGA), or the like.

Buffer 170 functions as a work memory of image processor 160 and controller 180. Buffer 170 can be realized by, for example, a dynamic random access memory (DRAM) or a ferroelectric memory.

Card slot 190 is a unit for attachment of memory card 200 to digital camera 100. Card slot 190 can mechanically and electrically connect memory card 200 and digital camera 100.

Memory card 200 includes a flash memory or a ferroelectric memory and can store data such as image files generated by image processor 160.

Built-in memory 240 is, for example, a flash memory or a ferroelectric memory. Built-in memory 240 stores a control program for entirely controlling digital camera 100, data, and the like.

Operation member 210 is a generic term of a user interface that receives a user's operation. Operation member 210 includes, for example, at least one of a button, a lever, a dial, a touch panel, and a switch that receive a user's operation. Furthermore, operation member 210 includes a focus ring disposed on an outer circumference of the lens barrel. The focus ring is a member that is operated to rotate by the user to move focus lens 111.

Display monitor 220 can display an image (a through image) indicated by the image data generated by CCD 140 and an image indicated by image data read from memory card 200. Furthermore, display monitor 220 can display various menu screens for making various settings of digital camera 100. Display monitor 220 is configured by a liquid crystal display device or an organic electro luminescence (EL) display device.

Gyro sensor 250 detects a shake (movement) of digital camera 100. A hand shake correction operation and still determination are performed based on an output signal from gyro sensor 250.

Figure 2:
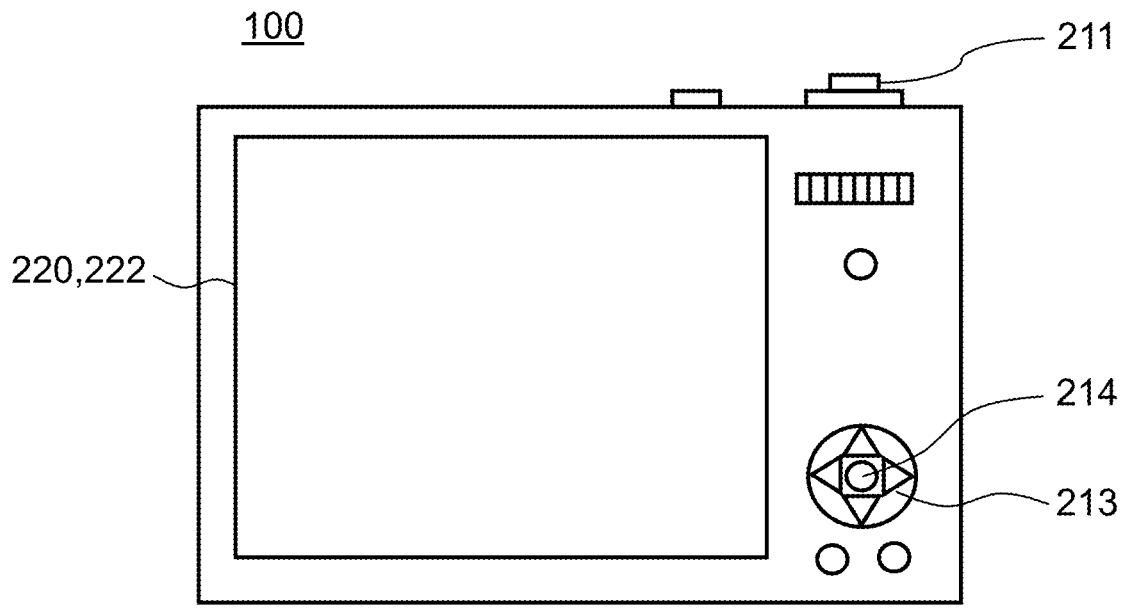
FIG. 2 is a back view of the digital camera.

FIG. 2 is a view illustrating a back surface of digital camera 100. FIG. 2 illustrates release button 211, selection buttons 213, determination button 214, and touch panel 222 as an example of operation member 210. Upon receipt of the user's operation, operation member 210 transmits various instruction signals to controller 180.

Release button 211 is a two-stage pressing type pressing button. When a user presses release button 211 halfway down, controller 180 executes, for example, autofocus control (AF control) and auto exposure control (AE control). When the user presses release button 211 fully down, controller 180 records image data captured at a timing of the pressing operation as a recording image in, for example, memory card 200.

Selection buttons 213 are a plurality of pressing buttons disposed in upper, lower, left, and right directions with respect to determination button 214. By pressing one selection button 213 in one of the upper, lower, left, and right directions, the user can move a cursor or a frame described below or select various condition items displayed on display monitor 220.

Determination button 214 is a pressing button. When the user presses determination button 214 while digital camera 100 is in a shooting mode or a playback mode, controller 180 displays a menu screen on display monitor 220. The menu screen is a screen for setting various conditions for shooting (recording) and playback. When determination button 214 is pressed down while any of various condition setting items is being selected, controller 180 determines the setting of the selected item.

Touch panel 222 is overlaid and disposed on a display screen of display monitor 220 and detects a touch operation on a display screen performed by the user's finger. Thus, the user can perform, for example, an operation for designating a region on an image displayed on display monitor 220.

2. Operation

An operation of digital camera 100 employing the above configuration will be described. Digital camera 100 includes a depth synthesis (focus stacking) function. The depth synthesis function is a function of synthesizing a plurality of images captured at different in-focus positions (hereinafter, also referred to as focus lens positions), and generating one still image having a pseudo deeper depth of field. The depth synthesis operation that uses the depth synthesis function of digital camera 100 will be described below.

2-1. Depth Synthesis

Figure 3:
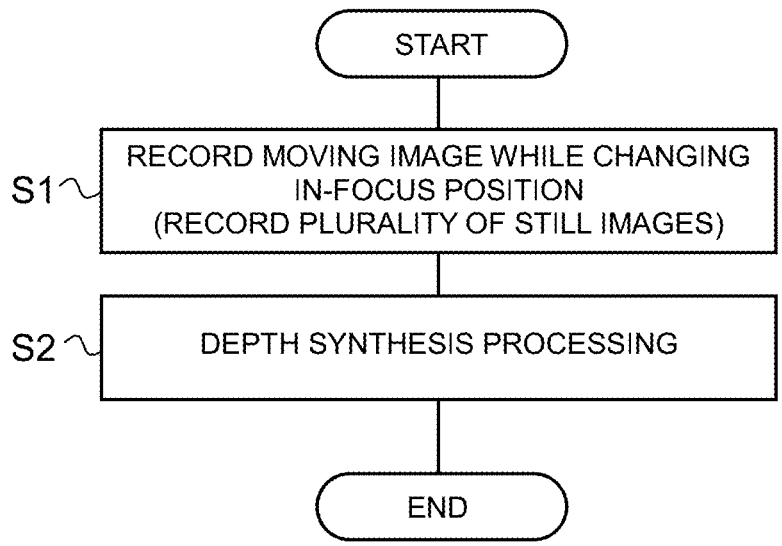
FIG. 3 is a flowchart illustrating a flow of processing of performing depth synthesis processing.

FIG. 3 is a view illustrating a flow of processing of executing the depth synthesis operation of digital camera 100. Digital camera 100 performs processing of recording a moving image while changing an in-focus position (focal position) to obtain a plurality of still images used for depth synthesis (S1). That is, controller 180 of digital camera 100 causes CCD 140 to capture images and generate moving image data while moving focus lens 111 along the optical axis. Subsequently, digital camera 100 executes the depth synthesis processing (S2) described later by using frame images (still images) included in the recorded moving image, and generates a still image having a deeper depth of field. Note that the depth synthesis processing (S2) may be successively performed after the recording processing (S1) of the moving image. Alternatively, the depth synthesis processing (S2) may be performed at any timing after completion of the recording processing (S1) of the moving image, for example, when the user performs a predetermined operation (an operation on a menu screen or an operation by using an operation button).

2-1-1. Recording of Moving Image for Depth Synthesis

The recording processing (S1) of the moving image used for the depth synthesis will be described with reference to FIGS. 4 to 7A and 7B. According to this processing, a moving image is recorded while an in-focus position is continuously changed to obtain a plurality of still images (frame images) having different in-focus positions. Hereinafter, a moving image recorded in this way will be referred to as a "multifocus moving image". Digital camera 100 has a specific shooting mode for recording this multifocus moving image. The user can set digital camera 100 to this specific shooting mode by, for example, operating a menu screen or an operation dial.

The multifocus moving image is a moving image recorded while the in-focus position (that is, focus lens position) is continuously changed. As the multifocus moving image, for example, a 4K moving image of high resolution having approximately 4000×2000 pixels is recorded. The depth synthesis processing is performed by using a plurality of frame images included in frame images that constitute this 4K moving image. An image subjected to the depth synthesis in this way is based on the 4K moving image and therefore has high image quality.

Figure 4:
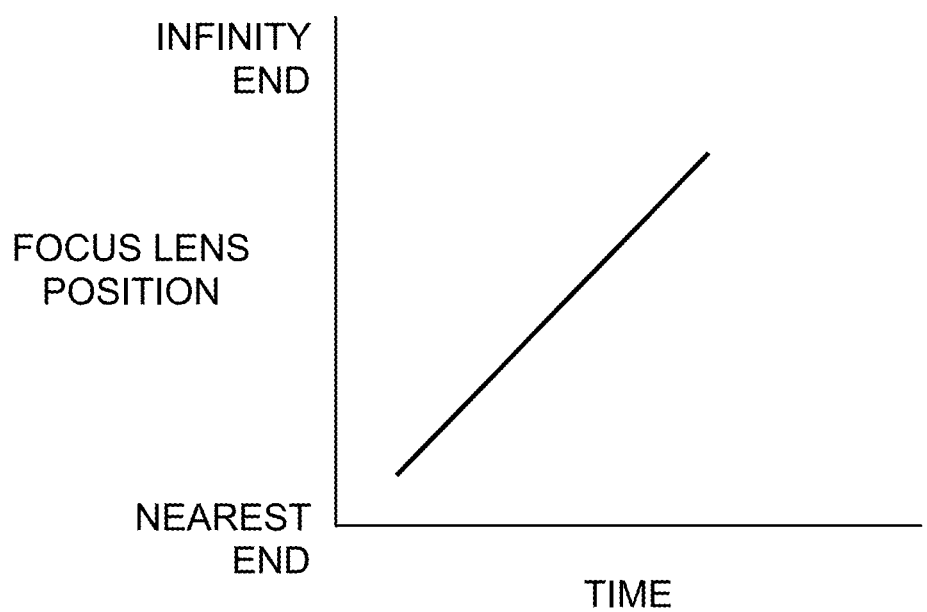
FIG. 4 is a view illustrating movement of a focus lens during recording of a multifocus moving image.
Figure 5:
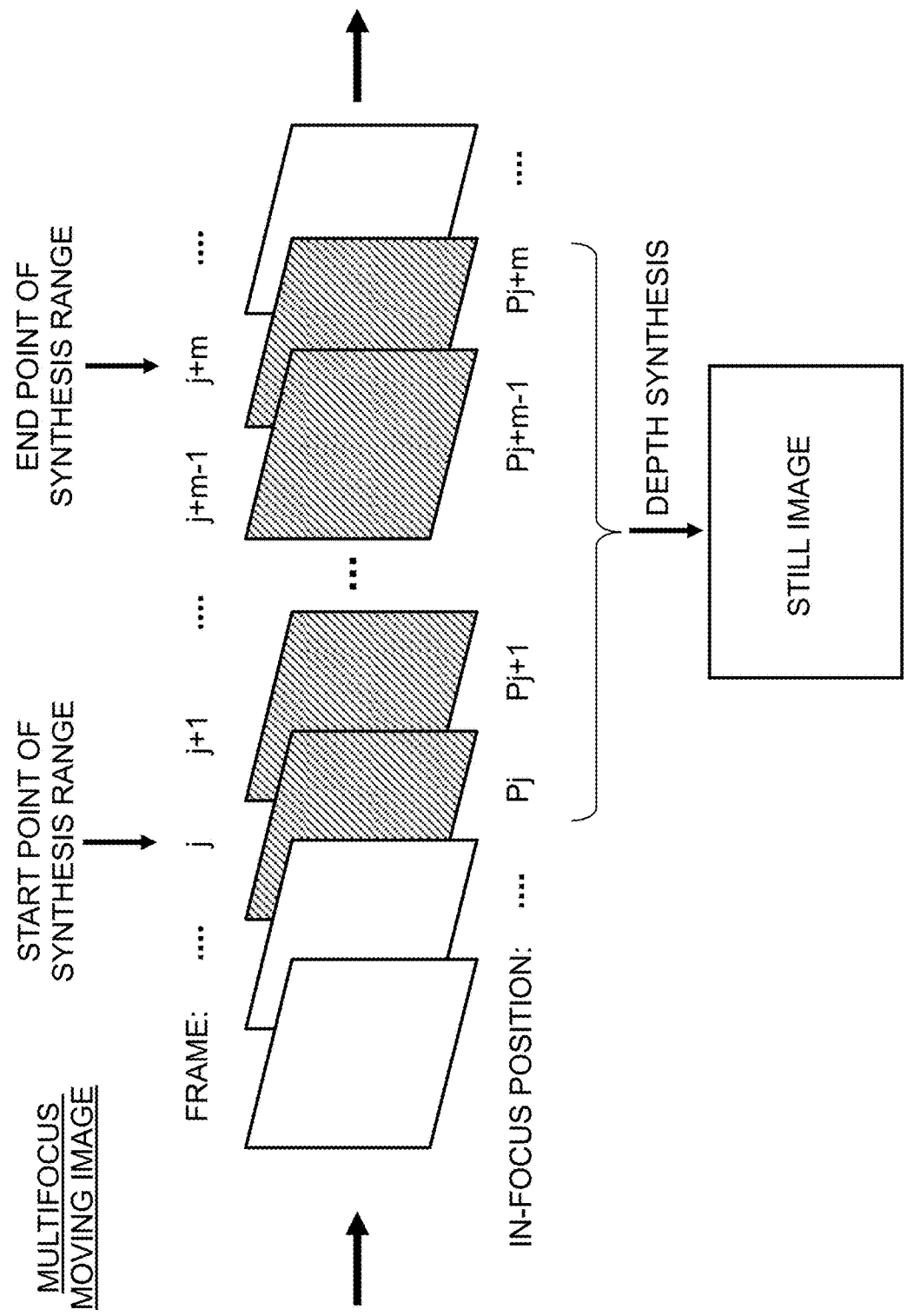
FIG. 5 is a view illustrating a concept of depth synthesis using frame images of the multifocus moving image.

The multifocus moving image is recorded by shooting a moving image while focus lens 111 is being moved from a nearest end side to an infinity end side (or vice versa) as illustrated in FIG. 4, i.e., while an in-focus position is being changed. The multifocus moving image recorded in this way includes a plurality of frame images Pn recorded at different in-focus positions as illustrated in FIG. 5. In the depth synthesis processing, digital camera 100 automatically sets a range of depth synthesis. Then, frame images that are in focus within the automatically-set synthesis range (hatched images in FIG. 5) are selected from the plurality of shot frame images Pn to be synthesized. Hereinafter, the synthesis range is also referred to as a depth synthesis range. Details of the automatic setting of the synthesis range will be described later.

Figure 6:
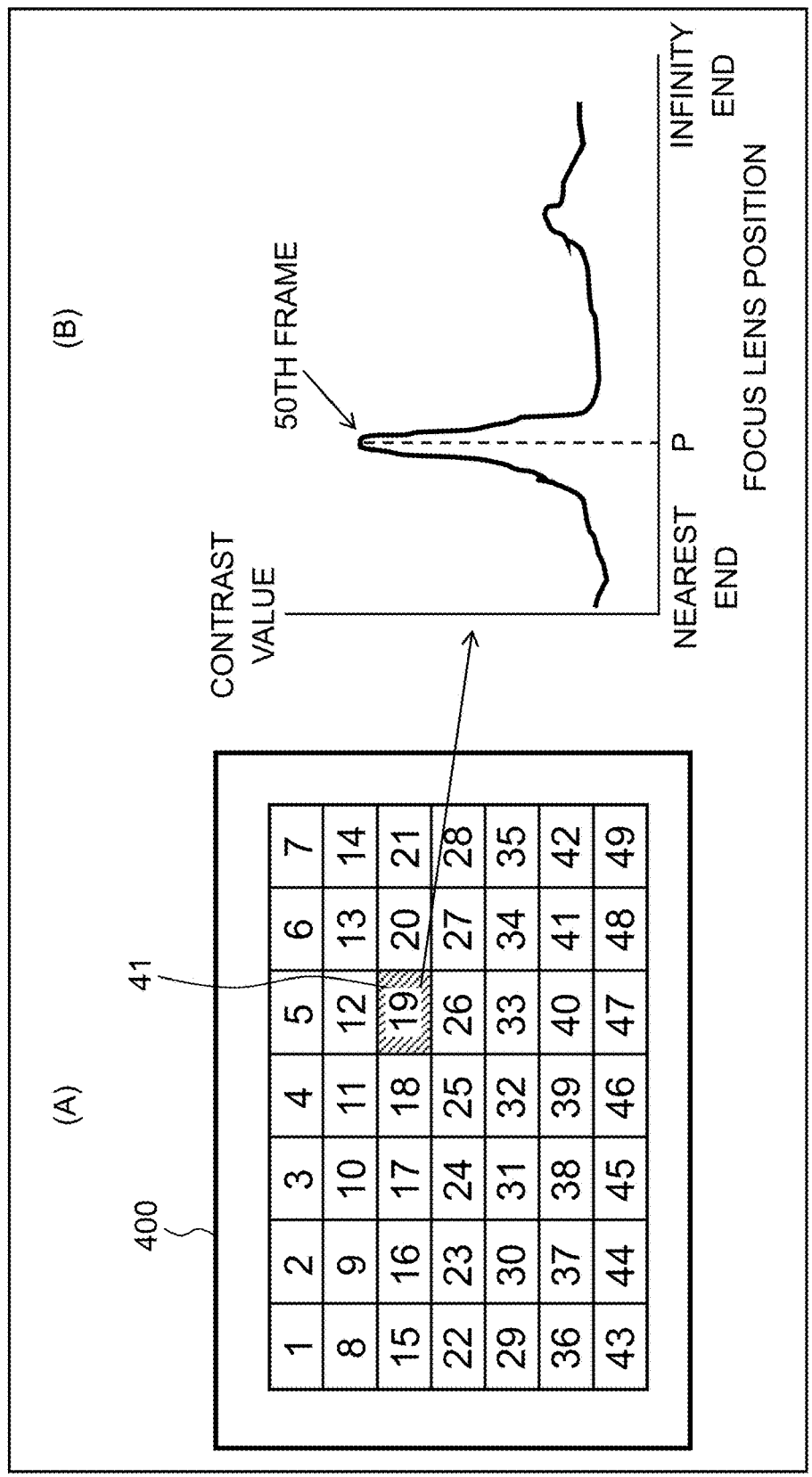
FIG. 6 is a view illustrating a change in a contrast value according to the movement of the focus lens in (A) a plurality of AF regions set in an image region, and in (B) one AF region.

Digital camera 100 according to the first exemplary embodiment sets a plurality of autofocus (AF) regions in image region 400 as illustrated in part (A) of FIG. 6 for an autofocus operation. In the first exemplary embodiment, 49 (seven rows×seven columns) AF regions are set. For each AF region, numbers (1 to 49) for identifying each AF region are assigned. For each AF region, a frame (hereinafter referred to as an in-focus frame) that focuses on a subject in each AF region is identified, and information related to the identified in-focus frame is recorded in an in-focus information table (described later). Digital camera 100 performs a focus search operation before recording (shooting) the multifocus moving images, detects an in-focus position of each AF region and generates the in-focus information table.

FIGS. 7A and 7B are views respectively illustrating data structures of in-focus information table 60 and in-focus information table 61. In-focus information table 60 stores information (nearest in-focus lens position) indicating a focus lens position (Pnear) that is closest to the nearest end and at which focus is achieved in the focus search operation, and information (farthest in-focus lens position) indicating a focus lens position (Pfar) that is closest to the infinity end and at which focus is achieved (refer to FIG. 7A). Further, in-focus information table 61 associates and manages, for each AF region, the position of focus lens 111 when focus is achieved in each AF region, and a frame number of a frame having an in-focus state in each AF region (refer to FIG. 7B).

For example, a contrast value is calculated for each AF region while focus lens 111 is moved in the focus search operation. For example, in 19th AF region 41 illustrated in part (A) of FIG. 6, a peak of the contrast value is assumed to be detected at focus lens position P as illustrated in part (B) of FIG. 6. In this case, focus lens position P is recorded in a field of a 19th AF region of in-focus information table 61 illustrated in FIG. 7B Then, in the recording operation of the multifocus moving image, a frame number of a frame shot at focus lens position P (in this example, "50") is associated with a position of focus lens 111 (in this example, "P"), and is recorded in in-focus information table 61. In-focus information table 60 and in-focus information table 61 are stored in, for example, a header of moving image data obtained by moving image shooting.

Figure 8:
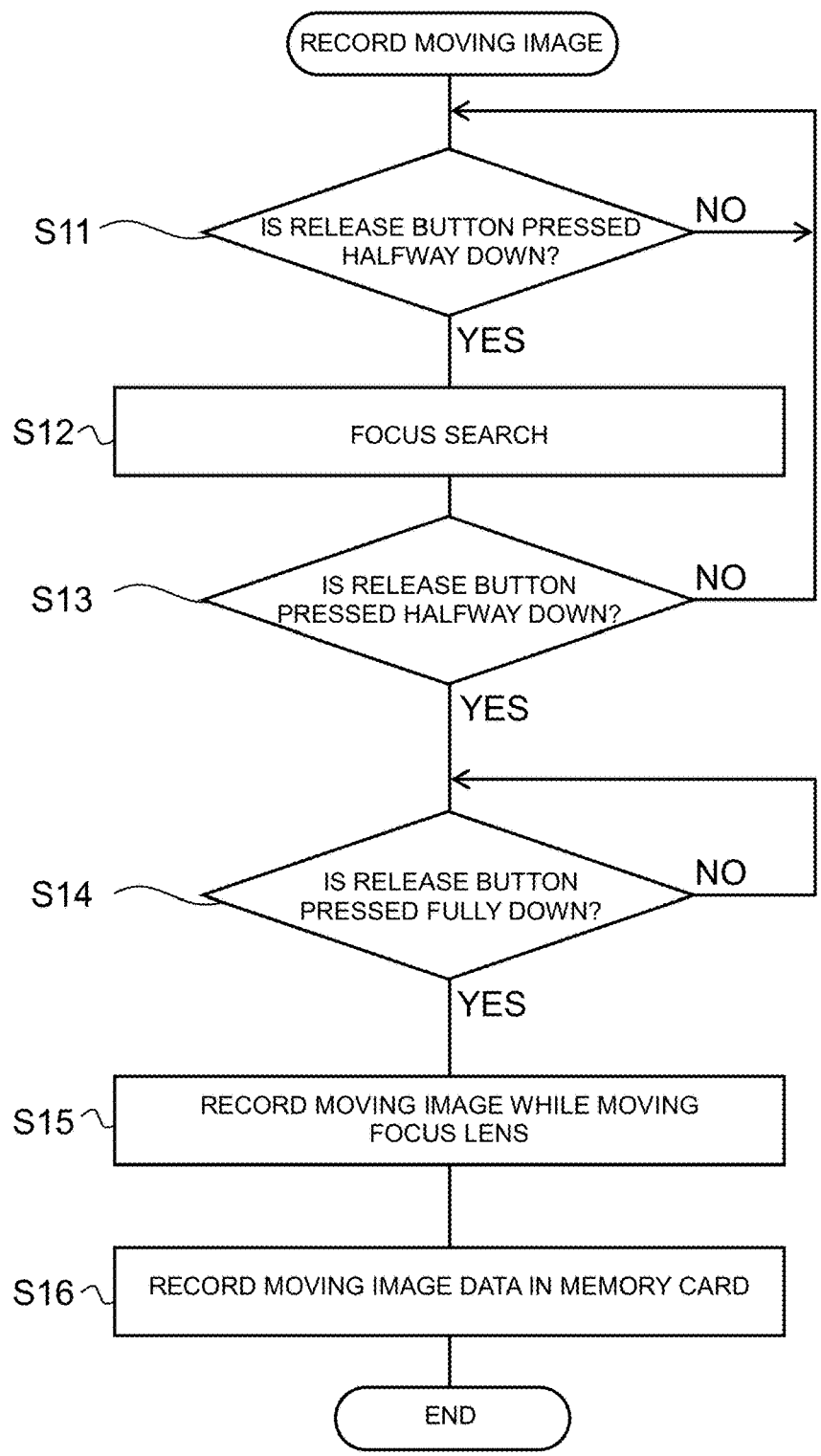
FIG. 8 is a flowchart illustrating focus search and multifocus moving image recording processing.

Details of the recording processing (S1) of the multifocus moving image used for depth synthesis will be described with reference to a flowchart of FIG. 8.

In digital camera 100 set in the specific shooting mode for recording the multifocus moving image, a desired view angle is set by the user performing an operation of zoom lens 112, for example. After the view angle is set, when the user presses release button 211 halfway down (YES in S11), controller 180 performs focus search for detecting the in-focus position of each AF region of the image and generating in-focus information table 60 and in-focus information table 61 (S12).

In the focus search, controller 180 detects a contrast value for each AF region while moving focus lens 111 from the nearest end to the infinity end (or vice versa) (refer to parts (A) and (B) of FIG. 6).

Further, controller 180 generates in-focus information table 61 based on the detected contrast value. More specifically, when moving focus lens 111 from the nearest end to the infinity end, controller 180 calculates a position of focus lens 111 at which the contrast value is maximized in a plurality of images, for each AF region (refer to part (B) in FIG. 6), and records this position of focus lens 111 in in-focus information table 61 (refer to row c in FIG. 7B). When the contrast value of each image is lower than a predetermined threshold in one AF region, it is determined that an in-focus position is not determined in this AF region. Therefore, a predetermined value indicating that the in-focus position is unclear is recorded in in-focus information table 61.

After performing the focus search for all AF regions, controller 180 further records the in-focus position closest to the nearest end (Pnear) and the in-focus position closest to the infinity end (Pear) among the in-focus positions calculated when moving focus lens 111 from the nearest end to the infinity end, into in-focus information table 60 (refer to row a in FIG. 7A). Thus, the focus search is finished. In this state, in-focus information table 61 does not yet include frame number information.

After finishing the focus search, controller 180 decides whether the user continues pressing release button 211 halfway down (S13).

When the user does not press release button 211 halfway down after the focus search is finished (NO in S13), controller 180 returns processing to step S11. Consequently, the user can retry the focus search.

When the user continues pressing release button 211 halfway down after the focus search is finished (YES in S13), controller 180 determines whether the user subsequently presses release button 211 fully down (S14).

Subsequently, when the user presses release button 211 fully down (YES in S14), controller 180 starts a moving image recording operation of recording the multifocus moving image (S15).

Figure 9:
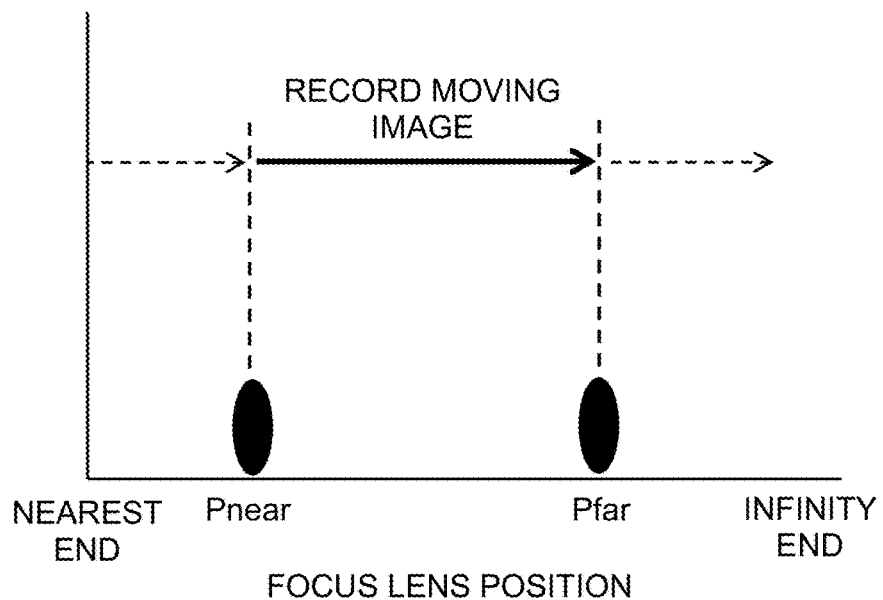
FIG. 9 is a view illustrating a movement range of the focus lens during recording of the multifocus moving image.

That is, controller 180 returns focus lens 111 to the nearest end, and records the moving image (multifocus moving image) while moving focus lens 111 from the nearest focus lens position (Pnear) to the farthest focus lens position (Pfar) as illustrated in FIG. 9 (S15). By limiting a movement range of focus lens 111 during moving image recording to a range (Pnear to Pfar) obtained in the focus search, the moving image recording is not performed in a range in which focus is not achieved. Thus, a time required for the moving image recording can be shortened. In the moving image recording, a moving image is recorded according to a predetermined format for moving image data. For example, the moving images are recorded according to MP4 standards (H.264/MPEG-4.AVC scheme). While the moving image recording is performed, display monitor 220 may display, for example, an icon or a message indicating that the moving image recording is being performed.

Further, controller 180 associates the position of focus lens 111 with a frame number of each frame that constitutes the moving image for each AF region, during the moving image recording. That is, controller 180 identifies, for each AF region, a frame number of a frame image that is shot at the focus lens position in in-focus information table 61 (refer to row c in FIG. 7B), and records the frame number into in-focus information table 61 in association with the focus lens position. Thus, the frame number is associated with each AF region in in-focus information table 61 (refer to row b in FIG. 7B).

While the moving image recording is performed, display monitor 220 displays an image which is being recorded. At this time, display monitor 220 may highlight a focus region of the image to make the user recognize the focus region. By highlighting the focused region, the user can easily learn a focused region in the image.

Returning to FIG. 8, when the moving image recording (S15) is finished, moving image data in which in-focus information table 60 and in-focus information table 61 are recorded in the header is recorded in memory card 200 (S16). Thus, the moving image (multifocus moving image) recording processing (S1) is finished.

After the moving image recording (S1) is finished, depth synthesis processing (S2) is performed.

2-1-2. Depth Synthesis Processing

Figure 10:
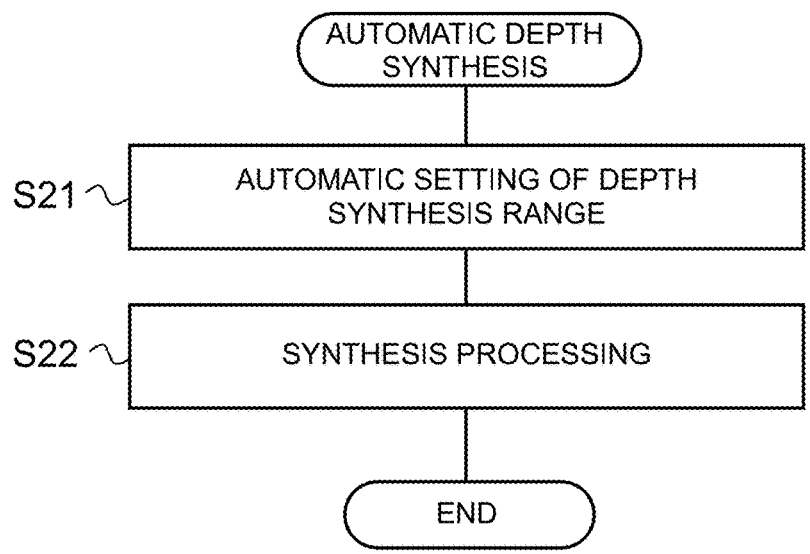
FIG. 10 is a flowchart illustrating automatic depth synthesis processing.

The depth synthesis processing (S2) will be described below. FIG. 10 is a flowchart illustrating the depth synthesis processing. In the depth synthesis processing, first, controller 180 automatically sets a depth synthesis range (synthesis range) in the depth synthesis processing using the frame images that constitute moving image data (S21), and performs the synthesis processing based on the set synthesis range (S22). Each processing (S21 and S22) will be described below.

2-1-2-1. Setting of Depth Synthesis Range

The automatic setting of the depth synthesis range will be described with reference to FIGS. 11 to 21.

Figure 11:
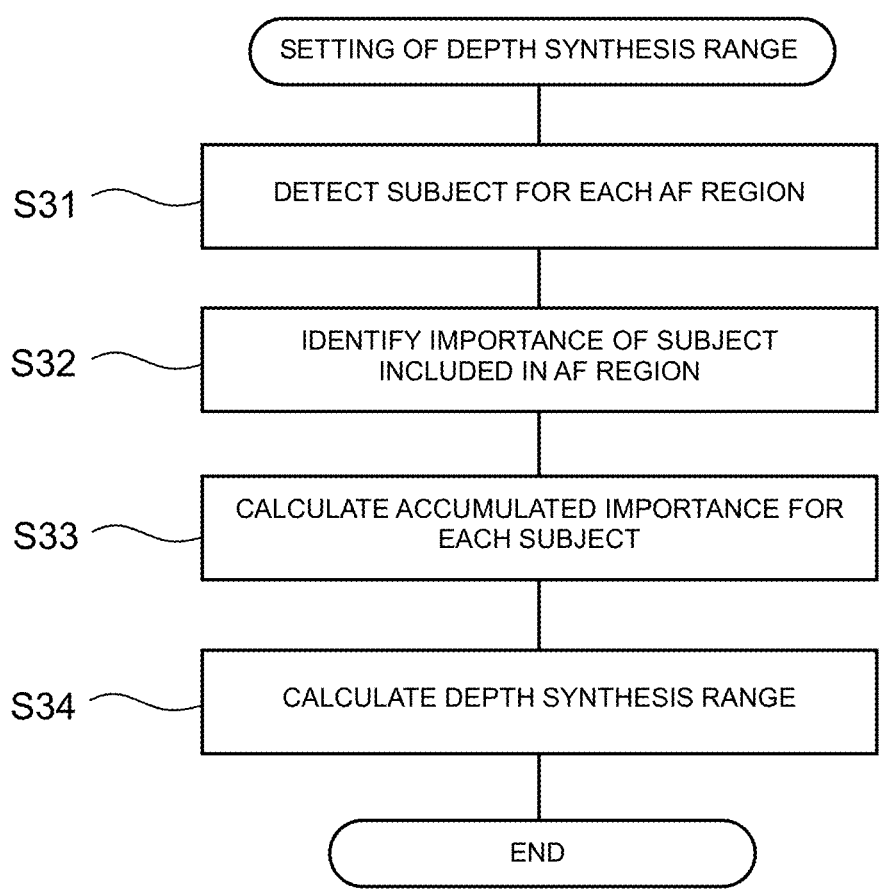
FIG. 11 is a flowchart illustrating setting processing of a depth synthesis range.
Figures 12A, 12B:
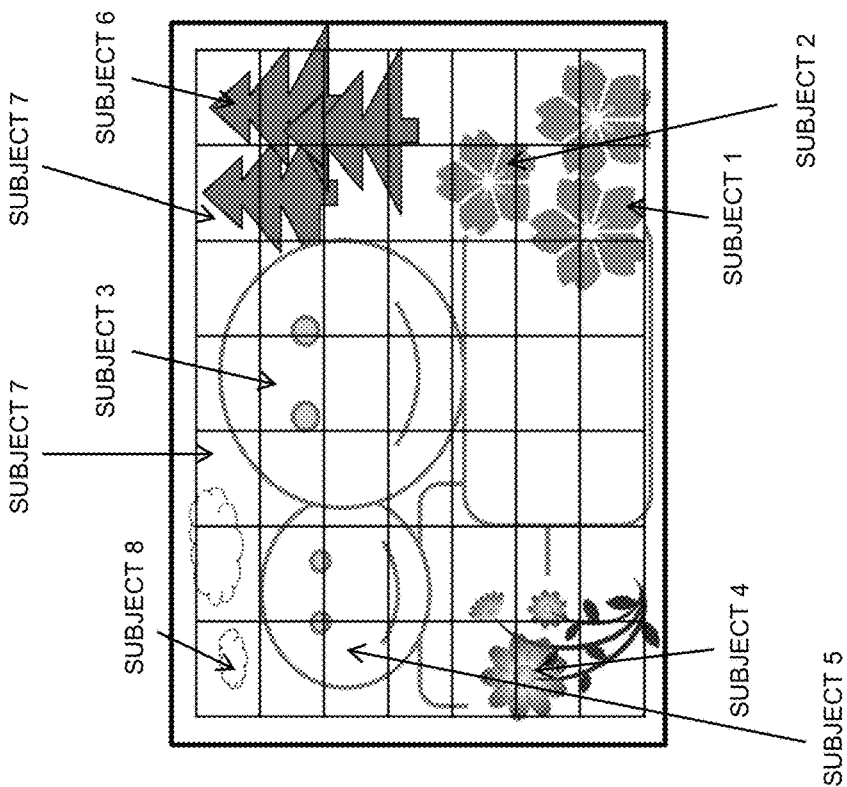
FIG. 12A is a view illustrating an example of a frame image including a plurality of subjects.
FIG. 12B is a view illustrating an example of the plurality of subjects that are extracted from each AF region.

FIG. 11 is a flowchart illustrating setting processing of the depth synthesis range. In the setting processing of the depth synthesis range, controller 180 first refers to in-focus information table 61 and identifies, for each AF region, a subject included in each AF region (S31). In other words, controller 180 identifies a subject included in each AF region, among a plurality of subjects included in the image. For example, when a frame image constituting a multifocus moving image includes a plurality of subject as illustrated in FIG. 12A, controller 180 identifies, for each AF region, a subject included in the AF region. Next, controller 180 identifies importance of the subject for each AF region (S32). Here, the importance of the subject is set according to a position of the subject in the image. Next, controller 180 calculates accumulated importance for each subject (S33). A calculation method of the accumulated importance will be described later. Next, controller 180 sets the synthesis range for depth synthesis (S34). More specifically, controller 180 determines a main subject according to the accumulated importance of the subject, and sets the synthesis range such that the determined main subject is located at a center of the synthesis range. Hereinafter, each processing described above (S31 to S34) will be specifically described.

First, a subject determining information table, a determining threshold table, and a weight table that are used in each processing (S31 to S34) will be described.

FIG. 13 is a view illustrating a configuration example of subject determining information table 70. Subject determining information table 70 is information to manage the subject (a whole or a part of the subject) included in each AF region among the plurality of subjects included in the image. As illustrated in FIG. 13, subject determining information table 70 manages a focus lens position of an AF region, an AF region number indicating the AF region, a subject number indicating a subject included in the AF region, and importance indicating importance of the subject included in the AF region, in association with each other. In subject determining information table 70, each data is sorted in order of the focus lens position.

FIG. 13 illustrates an example of subject determining information table 70 when a frame image includes a plurality of subjects 1 to 8 as illustrated in FIG. 12A. Subject 1 indicates a flower on the lower right side in the frame image illustrated in FIG. 12A. Subject 2 indicates a flower disposed above the flower that is subject 1 in the image. Subject 3 indicates a person at the center of the image. Subject 4 indicates a flower on the lower left side in the image. Subject 5 indicates a person on the left side in the image. Subject 6 indicates trees on the upper right side in the image. Subject 7 indicates sky on the upper side in the image. Subject 8 indicates clouds on the upper left side in the image. Subject number 1 illustrated in FIG. 13 indicates subject 1. Similarly, subject numbers 2 to 8 correspond to subjects 2 to 8, respectively. FIG. 14 is a view illustrating a configuration example of determining threshold table 72. Determining threshold table 72 manages a difference (threshold) between the focus lens positions when determining whether subjects are an identical subject, for each predetermined range of the focus lens position. A determining threshold is set so as to be different for each predetermined range of the focus lens position. For example, when the focus lens position is 0 or more and less than 100, the determining threshold is set to 10. More specifically, when both focus lens positions of two adjacent AF regions are within the range of 0 to less than 100, and when a difference between the focus lens positions of the two AF regions is not more than 10 (determining threshold), subjects in the two AF regions are determined as an identical subject and are given an identical subject number. The determining threshold is set to a larger value, as a value of the focus lens position becomes larger (is closer to the infinity end). Further, a width of the predetermined range is set to be larger, as the focus lens position is closer to the infinity end. With those settings, in a case where the focus lens is located at a position close to the nearest end, when there is any difference in the focus lens position between the two regions, subjects in the two regions are determined as different subjects. In contrast, in a case where the focus lens is located at a position close to the infinity end, even when there is a large difference in the focus lens position between the two regions, subjects in the two regions are determined as the identical subject.

The weight table will be described with reference to FIGS. 15A and 15B. The weight table is a table to manage, for each AF region, importance (weight) of a subject included in each AF region. In the first exemplary embodiment, as illustrated in FIG. 15A, a weight indicating importance of a subject is set for each AF region. Particularly, in an example in FIG. 15A, a value of the weight (importance) is set to be larger as a position of the weight is closer to the center of the image. This is because, in general, a subject considered to be important by a photographer is often disposed in the center region in an image. FIG. 15B is a view illustrating a configuration of weight table 74 when the weight is set for each AF region as illustrated in FIG. 15A. A method for setting the weight is not limited to an aspect illustrated in FIG. 15A.

Figure 16:
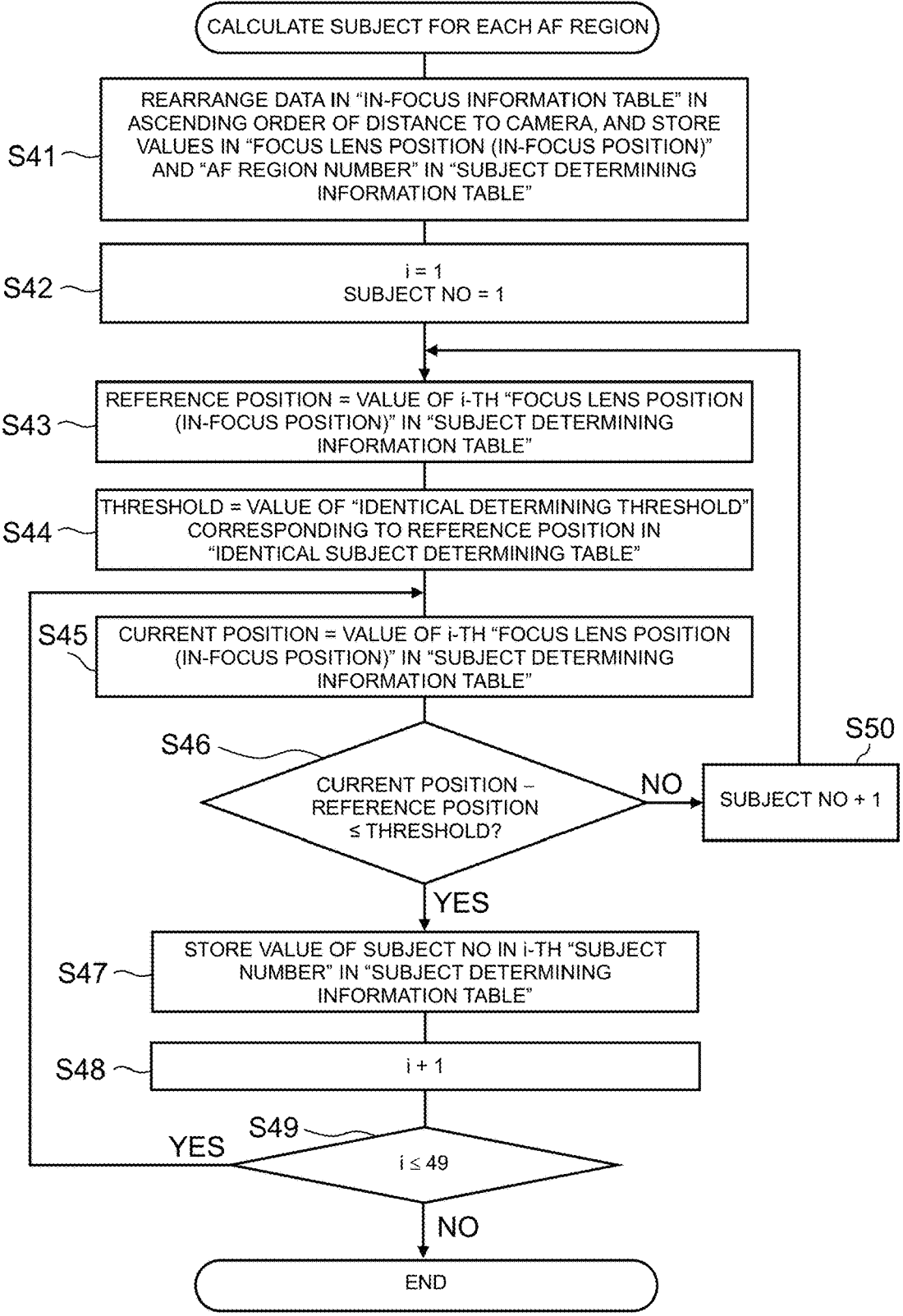
FIG. 16 is a flowchart illustrating processing for detecting AF regions including an identical subject.

With reference to a flowchart in FIG. 16, calculation processing of a subject for each AF region (step S31) in the flowchart in FIG. 11 will be specifically described. Controller 180 first refers to in-focus information table 61 and stores values into a "focus lens position (in-focus position)" and an "AF region number" in subject determining information table 70 (S41). At this time, controller 180 rearranges data in in-focus information table 61 in increasing order (ascending order) of the focus lens position (in-focus position), and stores respective values into the "focus lens position (in-focus position)" and the "AF region number" in subject determining information table 70.

For this purpose, controller 180 reads data from in-focus information table 61 (refer to FIG. 7B) in order of the focus lens position (ascending order), and records the AF region numbers into subject determining information table 70 in association with the focus lens positions. Upon completion of processing in step S41, subject determining information table 70 is incomplete, since a subject number and importance are not yet stored.

Next, controller 180 performs processing for storing the subject number in subject determining information table 70 (S42 to S50). Controller 180 first initializes both counter i and a variable "subject No" to "1" (S42).

Next, controller 180 sets a value of an i-th focus lens position (in-focus position) in subject determining information table 70 to a variable "reference position" (S43).

Next, controller 180 refers to determining threshold table 72 and obtains a threshold that is used as a determining reference when determining whether subjects are the identical subject (S44). In the first exemplary embodiment, controller 180 determines whether the subjects are the identical subject based on the focus lens positions. More specifically, when a difference between an in-focus position of one subject and an in-focus position of another subject adjacent to the one subject is equal to or less than the threshold, those subjects are determined as the identical subject. Determining threshold table 72 provides the threshold used here. As described above, the threshold is set for each predetermined range of the focus lens position in determining threshold table 72.

Controller 180 sets a value of the i-th focus lens position (in-focus position) in subject determining information table 70 to a variable "current position" (S45). Next, controller 180 determines whether a difference between the current position and the reference position is equal to or less than the threshold (S46).

When the difference between the current position and the reference position is equal to or less than the threshold (YES in S46), controller 180 sets a value of a subject No to a value of an i-th subject number in subject determining information table 70 (S47). This is because, when the difference between the current position and the reference position is equal to or less than the threshold, a subject located at the current position and a subject located at the reference position can be determined as the identical subject since the focus lens positions of the subjects are close to each other.

Then a value of counter i is incremented by 1 (S48). Subsequently, whether the value of counter i is equal to or less than 49 is determined in step S49. When the value of counter i is equal to or less than 49 (YES in step S49), controller 180 returns processing to step S45. When the value of counter i exceeds 49 (NO in step S49), processing is finished.

On the other hand, in step S46, when the difference between the current position and the reference position is larger than the threshold (NO in S46), controller 180 increments the subject No by 1 (S50), and returns processing to step S43.

With the above-described processing, the focus lens positions (in-focus positions), the AF region numbers, and the subject numbers are set in subject determining information table 70. Thus, as illustrated in FIG. 12B, the plurality of subjects 1 to 8 are extracted from the frame image in a specific manner, based on the focus lens position for each AF region. However, the importance is not yet set in subject determining information table 70 at this moment.

Figure 17:
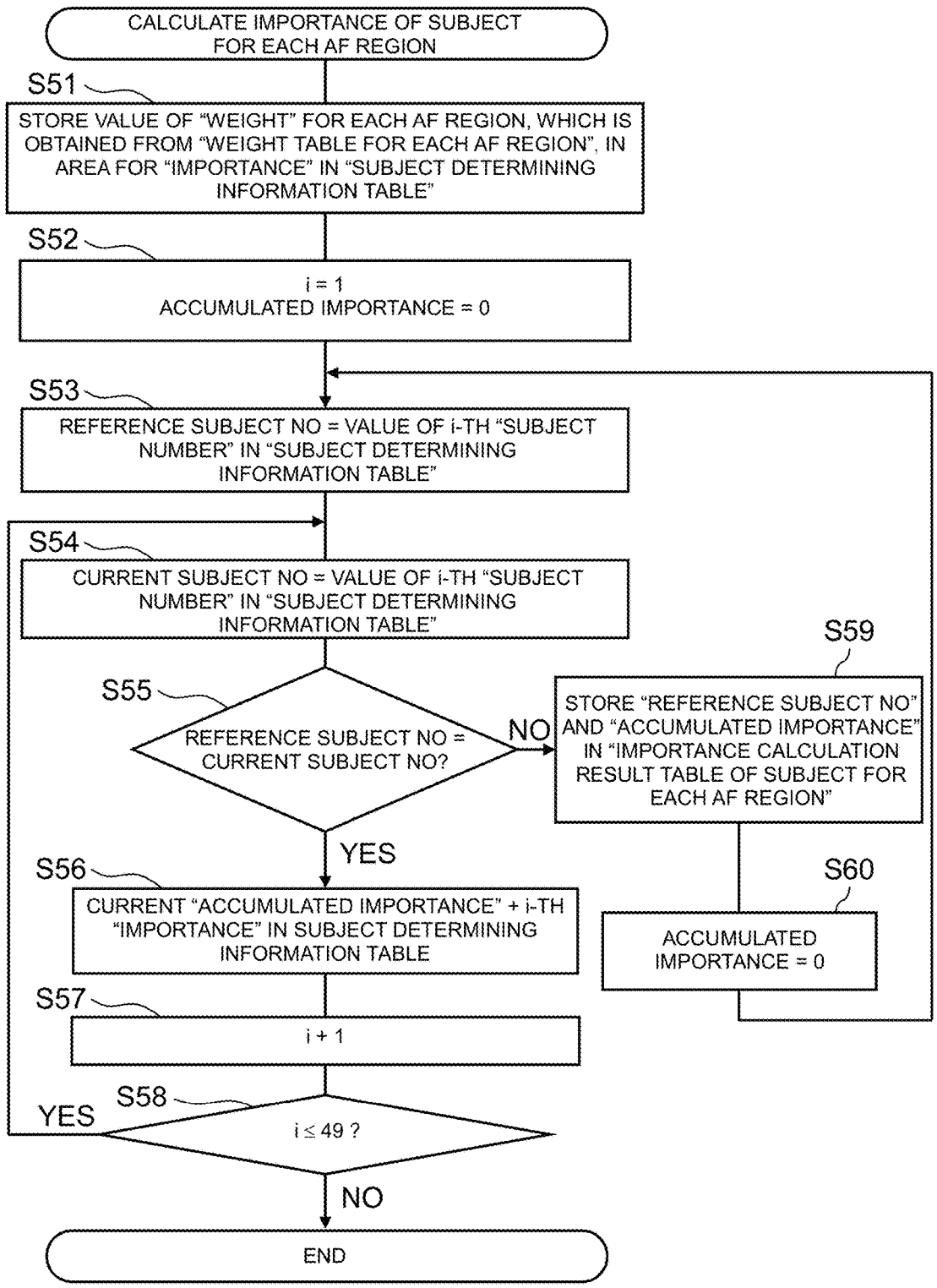
FIG. 17 is a flowchart illustrating processing for calculating importance (accumulated importance) of a subject included in each AF region.

Next, with reference to a flowchart in FIG. 17, identification processing of importance of a subject included in each AF region (step S32) and calculation processing of accumulated importance for each subject (step S33) in the flowchart in FIG. 11 will be described in a specific manner.

Controller 180 first sets "importance" of subject determining information table 70 (S51). More specifically, controller 180 obtains a "weight" for each AF region from weight table 74, and stores the weight into the "importance" in subject determining information table 70. Thus, as illustrated in FIG. 13, subject determining information table 70 that stores all values is completed. Step S51 is a detailed step of step S32 in FIG. 11.

Next, controller 180 performs processing for calculating the accumulated importance for each subject (S52 to S60). For this purpose, controller 180 first initializes counter i to "1" and a variable "accumulated importance" to "0" (S52).

Then, controller 180 sets a value of a "subject number" corresponding to the i-th focus lens position (in-focus position) in subject determining information table 70 to a variable "reference subject No" (S53). Further, controller 180 sets the value of the "subject number" corresponding to the i-th focus lens position (in-focus position) to a variable "current subject No" (S54).

Next, controller 180 compares the reference subject No with the current subject No (S55). When the reference subject No is equal to the current subject No (YES in S55), controller 180 adds a value of importance corresponding to the i-th focus lens position in subject determining information table 70 to a value of the variable "accumulated importance" (S56). That is, in step S56, items of importance of AF regions each having the same subject number in subject determining information table 70 are added up. By adding up the items of importance of the AF regions each having the same subject number in this manner, a subject having a larger area in the image has a larger value of accumulated importance. Further, a value weighted according to a position of a subject in an image is used for importance for each AF region. As described above, in the first exemplary embodiment, accumulated importance of a subject is set based on the area and the position of the subject in the image.

Then controller 180 increments counter i by 1 (S57), and determines whether counter i is equal to or less than 49 (S58). When a value of counter i is equal to or less than 49 (YES in step S58), controller 180 returns processing to step S54. When the value of counter i exceeds 49 (NO in step S58), processing is finished.

On the other hand, when the reference subject No is not equal to the current subject No (NO in S55), controller 180 associates a value indicated by the variable "reference subject No" (subject number) with a current value of the variable "accumulated importance", and stores those values in a subject importance table that manages the accumulated importance for each subject (S59). FIG. 18 is a view illustrating a configuration example of the subject importance table. Subject importance table 76 manages the subject number and the accumulated importance in association with each other.

Then, controller 180 resets the value of the variable "accumulated importance" to 0 (S60), and returns processing to step S53. With this configuration, a target whose accumulated importance is to be calculated is changed to a subject indicated by a next subject number in subject determining information table 70.

By repeating the above-described processing, items of accumulated importance for all subjects indicated by subject numbers recorded in subject determining information table 70 are calculated, and the calculated results are stored in subject importance table 76. Those steps S52 to S60 are detailed steps of step S33 in FIG. 11.

Figure 19:
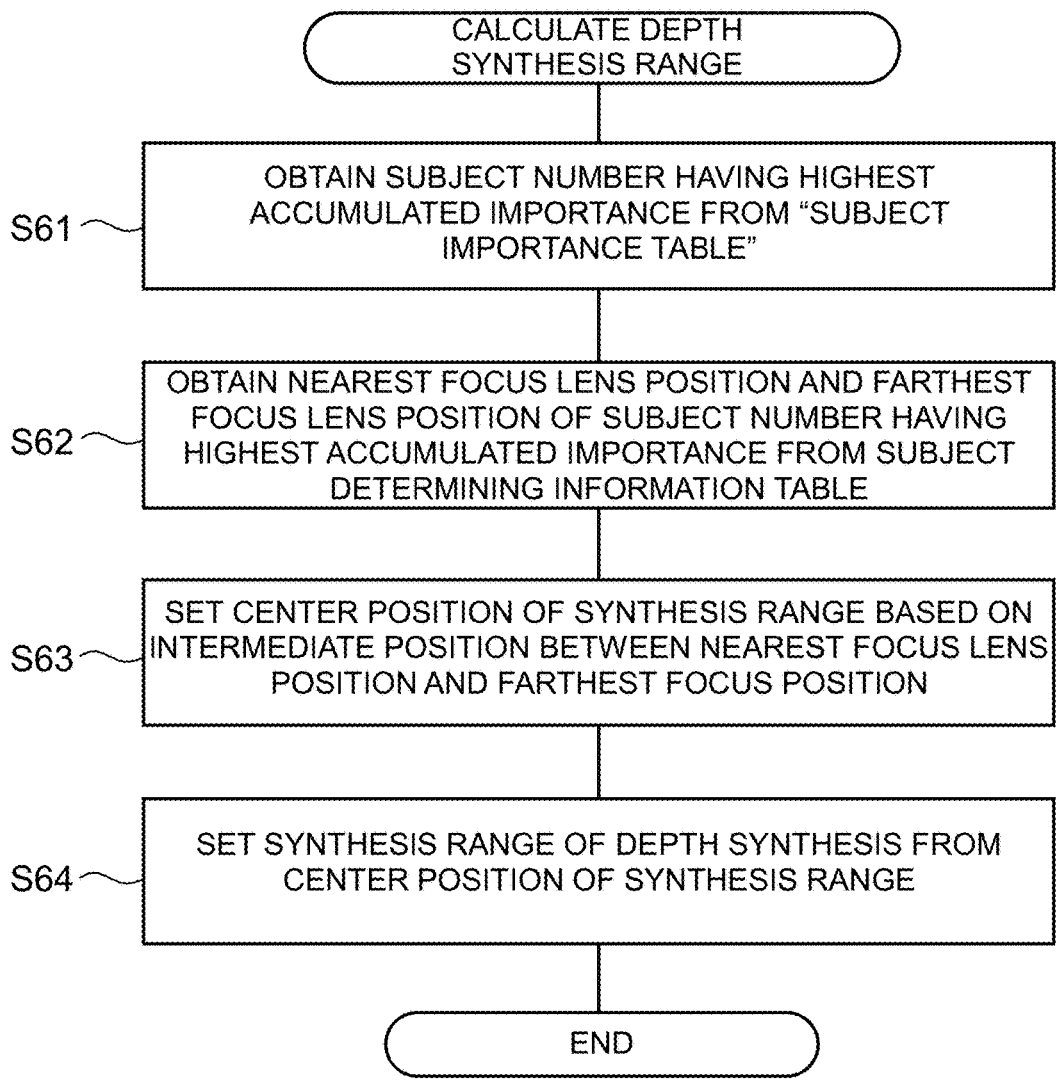
FIG. 19 is a flowchart illustrating calculation processing of the depth synthesis range.

With reference to subject importance table 76 recorded as described above, controller 180 sets a range of images used in the depth synthesis processing. FIG. 19 is a flowchart illustrating detailed processing of calculating processing (step S34) of the depth synthesis range in the flowchart in FIG. 11. In this processing, the range of the images used in the depth synthesis processing is set.

Controller 180 refers to subject importance table 76 and obtains a subject number corresponding to the highest accumulated importance (S61). For example, in the example illustrated in FIG. 18, controller 180 obtains a subject number "3" corresponding to the highest accumulated importance "101". By identifying the subject number corresponding to the highest accumulated importance in this manner, the main subject that is considered to be important by a user is detected.

Next, controller 180 refers to subject determining information table 70, and obtains a focus lens position closest to the nearest end (hereinafter, referred to as a "nearest focus position") and a focus lens position closest to the infinity end (hereinafter, referred to as a "farthest focus position") among focus lens positions (in-focus positions) corresponding to the obtained subject number (that is, main subject) (S62). For example, when "3" is obtained as the subject number corresponding to the highest accumulated importance (that is, when "subject 3" is detected as the main subject), controller 180 obtains "400" as the nearest focus position, and "470" as the farthest focus position among the focus lens positions corresponding to the subject number "3", from subject determining information table 70 (illustrated in FIG. 13).

Next, controller 180 calculates the center focus lens position of the synthesis range (hereinafter, referred to as "center position of synthesis range") from the nearest focus position and the farthest focus position (S63). More specifically, controller 180 obtains a focus lens position closest to an intermediate value between the nearest focus position and the farthest focus position, from subject determining information table 70. Note that, in subject determining information table 70, when candidates are found on both the nearest end side and the infinity end side of the intermediate value, the one having more AF regions is set as the focus lens position closest to the intermediate value. More specifically, a number of AF regions in which the focus lens position closest to the intermediate value on the nearest end side is recorded is compared with a number of AF regions in which the focus lens position closest to the intermediate value on the infinity end side is recorded, and a focus lens position corresponding to the one having a larger number is set as the focus lens position closest to the intermediate value. Note that, regardless of the number of AF regions, a focus lens position closest to the intermediate value may be simply determined as the focus lens position closest to the intermediate value on the nearest end side or the infinity end side. Controller 180 then sets the focus lens position closest to the intermediate value as the center position of the synthesis range.

For example, when controller 180 obtains "400" as the focus lens position on the nearest end side corresponding to the subject number "3" and obtains "470" as the focus lens position on the infinity end side corresponding to the subject number "3" from subject determining information table 70 illustrated in FIG. 13, the intermediate value is calculated to be "435". In this case, candidates of a focus lens position closest to the intermediate value "435" includes a focus lens position "430" on the nearest end side and a focus lens position "440" on the infinity end side. As an AF region whose focus lens position is "430", there is only one region having an AF region number "11". In contrast, as an AF region whose focus lens position is "440", there are three regions having AF region numbers "17", "19", and "32", respectively. In this case, the number of the AF regions whose focus lens position is "440" is larger than that of the AF regions whose focus lens position is "430". Therefore, the focus lens position closest to the intermediate value is set to "440". As described above, the focus lens position closest to the intermediate value "435" in subject determining information table 70 is calculated as "440". This focus lens position "440" is set as the center position of the synthesis range.

Returning to FIG. 19, controller 180 then sets the depth synthesis range based on the center position of the synthesis range (S64). More specifically, controller 180 calculates a position spaced apart from the focus lens position at the center position of the synthesis range to the nearest end by a predetermined value, as a lower limit of a range that can be set as the synthesis range (hereinafter, referred to as a settable range). Further, controller 180 calculates a position spaced apart from the focus lens position at the center position of the synthesis range to the infinity end by the predetermined value, as an upper limit of the settable range.

Here, the above-described predetermined value is set to a distance in which, upon synthesizing images, the synthesis image is not collapsed. In a case where two adjacent regions are set as the depth synthesis range in one image, when a difference in the focus lens position (in-focus position) between the two regions is large, an unnatural synthesis image may be obtained. This is because the large difference in the focus lens position (in-in-focus position) between the two regions causes an in-focus state (blurred state) in each region to be largely different from each other. In other words, this is because those two regions are not connected smoothly with each other at the vicinity of a boundary. Then, in the first exemplary embodiment, when the depth synthesis is performed, a range of a focus lens position corresponding to the synthesis range is limited, so as not to synthesize regions where the difference between the focus lens positions (in-focus positions) is larger than the predetermined value.

Then controller 180 refers to subject determining information table 70 to identify a focus lens position closest to the nearest end (hereinafter, referred to as "start position of synthesis range") within the range that can be set as the synthesis range. Further, controller 180 refers to subject determining information table 70 to identify a focus lens position closest to the infinity end (hereinafter, referred to as "end position of synthesis range") within the range that can be set as the synthesis range. With this configuration, a predetermined range centered around the main subject is set as the synthesis range.

With reference to FIG. 20, the above-described setting processing of the synthesis range will be described using a specific example. In this example to be described, the focus lens position (in-focus position) at the center of the synthesis range is assumed to be "440", and the predetermined value in which the synthesis image is not collapsed is assumed to be "300". In this case, the lower limit of the range that can be set as the synthesis range is calculated as "140" (=440−300), and the upper limit of the range that can be set as the synthesis range is calculated as "740" (=440+300). By referring to subject determining information table 70, the nearest focus lens position is identified as "150", and the farthest focus lens position is identified as "640", within the settable range (a range from 140 to 740). Accordingly, a range of the focus lens position (in-focus position) from 150 to 640 is set as the synthesis range of the depth synthesis processing.

Figure 21:
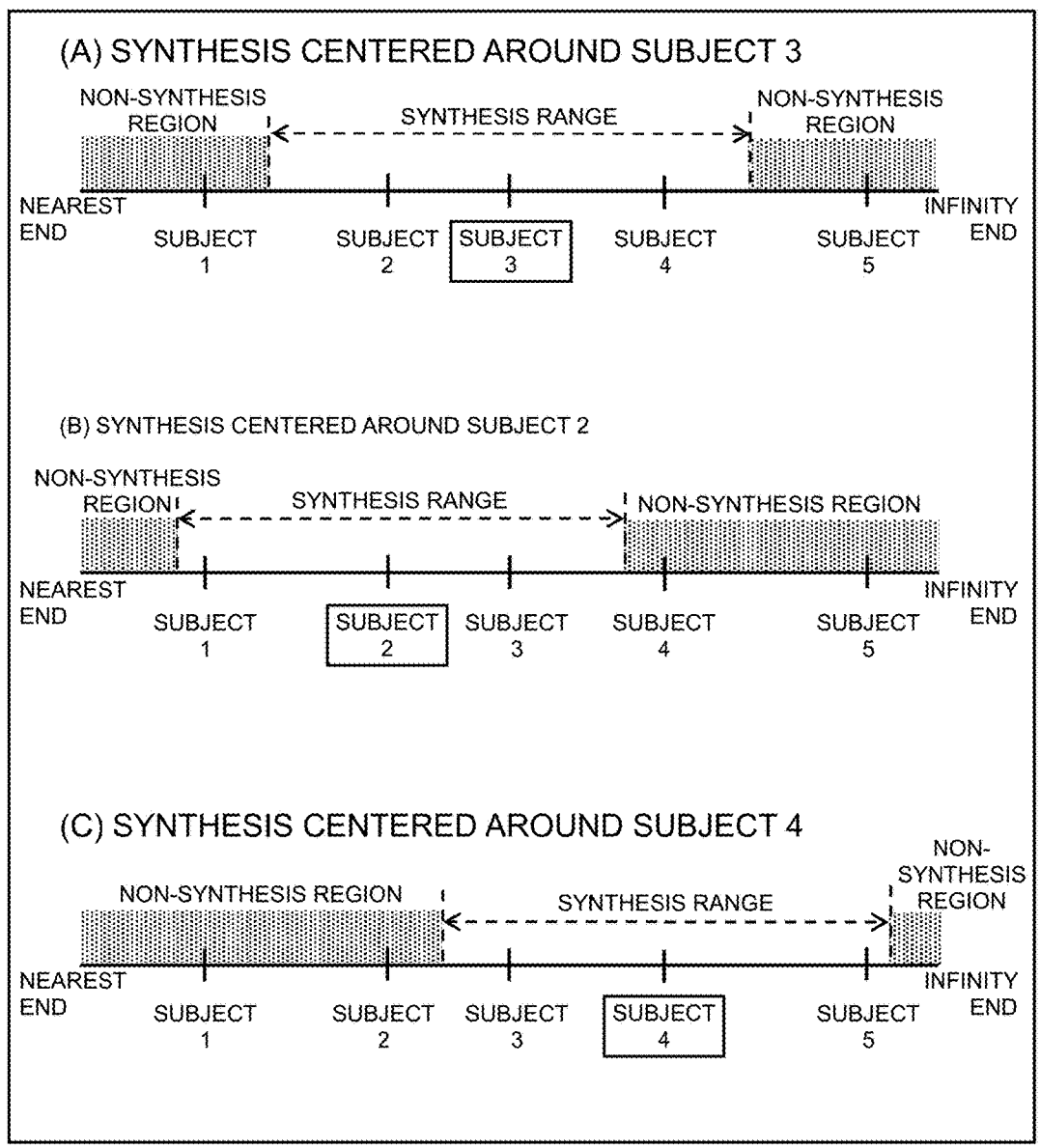
FIG. 21 is a view illustrating the depth synthesis range that is automatically set.

Each of parts (A) to (C) of FIG. 21 illustrates the synthesis range of the depth synthesis processing set for the main subject. For example, in the first exemplary embodiment, subject 3 is identified as the main subject. In this case, as illustrated in part (A) of FIG. 21, the synthesis range is set centered around subject 3. When subject 2 illustrated in FIG. 12B is the main subject, as illustrated in part (B) of FIG. 21, the synthesis range is set centered around subject 2. When subject 4 illustrated in FIG. 12B is the main subject, as illustrated in part (C) of FIG. 21, the synthesis range is set centered around subject 4. A non-synthesis region in parts (A) to (C) of FIG. 21 is a region in which an image is highly likely to be collapsed when the depth synthesis is performed. In other words, in a boundary between a region within the synthesis range and the non-synthesis region, the difference between the focus lens positions (in-focus positions) becomes extremely large, and therefore, when the depth synthesis is performed, an unnatural image is highly likely to be generated. Therefore, in the first exemplary embodiment, both on the nearest end side and the infinity end side, a region whose focus lens position is spaced apart from the focus lens position at the center position of the synthesis range by a predetermined value or more is set as the non-synthesis region that is not used for the synthesis processing.

2-1-2-2. Synthesis Processing

When the synthesis range of the depth synthesis processing (that is, the start position and the end position) is set as described above, frame images that are focused within the synthesis range are depth-synthesized, thereby generating the synthesis image. Therefore, controller 180 refers to in-focus information table 61 illustrated in FIG. 7B to identify frame numbers that respectively correspond to the start position (focus lens position) of the synthesis range and the end position (focus lens position) of the synthesis range. Controller 180 performs the depth synthesis processing using all or part of frame images indicated by the two identified frame numbers and frame images between the two frame numbers. The depth synthesis processing can be performed using known techniques.

3. Effects and the Like

As described above, digital camera 100 (an example of the imaging apparatus) of the first exemplary embodiment includes CCD 140 (an example of the imaging unit) that captures the subject image while changing an in-focus position to generate a plurality of pieces of image data, image processor 160 (an example of the image processor) that synthesizes a plurality of pieces of frame image data (an example of the plurality of pieces of image data) generated by CCD 140 to generate still image data having a deeper depth of field than those of the plurality of pieces of image data, and controller 180 (an example of the control unit) that controls image processor 160. Controller 180 controls image processor 160 so as to detect a main subject from an image indicated by one frame image data in the plurality of pieces of frame image data, determine a range for synthesizing the plurality of pieces of image data using a position of the detected main subject as a reference, and synthesize pieces of image data focused within the determined range in the plurality of pieces of image data to generate still image data.

Digital camera 100 having the above-described configuration automatically detects the main subject from the image, sets a depth synthesis range centered around the main subject, and performs depth synthesis processing using the pieces of image data focused within the set range. Therefore, a user can omit operations such as designation of the depth synthesis range, and therefore can easily obtain an image of the deepest depth of field in a range in which the synthesis image is not collapsed.

Furthermore, in the first exemplary embodiment, controller 180 of digital camera 100 calculates importance (for example, accumulated importance illustrated in FIG. 18) for each of a plurality of subjects included in the image indicated by one frame image data, and sets the main subject from a plurality of subjects based on the calculated importance. With this configuration, the synthesis image centered around the main subject can be generated, thereby obtaining the focus image centered around the subject that is considered more important by a user.

The importance (accumulated importance) may be calculated based on any one of parameters such as an area, a position, and a type of the subject in the image, or may be calculated based on a plurality of parameters. In the first exemplary embodiment, the importance is set to a higher value as an area of the subject in the image becomes larger. Further, in the first exemplary embodiment, the importance is set to a higher value as a position of the subject is closer to the center of the image. By setting the importance in this manner based on both the area and the position of the subject in the image, the focused image centered around the subject that is thought important by the user can be obtained more efficiently.

Further, in the first exemplary embodiment, controller 180 identifies the image by dividing the image into a plurality of AF regions (an example of the region). Controller 180 then determines that, when a difference between the in-focus positions in the two adjacent regions (for example, a first region and a second region) is equal to or less than a determining threshold (an example of the predetermined value) illustrated in FIG. 14, the two adjacent regions include at least one identical subject. In this manner, controller 180 can determine whether the subjects are identical or not.

In the first exemplary embodiment, the determining threshold is set so as to be different according to the in-focus position (refer to determining threshold table 72). For example, the determining threshold may be set smaller as the in-focus position is closer to the nearest end, and may be set larger as the in-focus position is farther from the nearest end (that is, as the in-focus position is closer to the infinity end) (refer to FIG. 14). Since an image captured at different in-focus position on a nearest side includes a large amount of blur, the synthesis image is highly likely to be collapsed. Therefore, the determining threshold is set smaller on the nearest side. On the other hand, since an image captured at an in-focus position on a far side is focused over the entire image, the synthesis image is unlikely to be collapsed. Therefore, the determining threshold is set larger on the far side. The determining threshold may be changed according to a lens used for image shooting.

In the first exemplary embodiment, when detecting the main subject, controller 180 uses in-focus information table 61 in which a frame number (an example of information for identifying each of a plurality of pieces of image data), information indicating a focused AF region in each of the plurality of pieces of image data, and a focus lens position (in-focus position) in generating each of the plurality of pieces of image data are associated with each other. By referring to in-focus information table 61, the focus lens position (in-focus position) can be associated with the frame image.

In the first exemplary embodiment, CCD 140 (an example of the imaging unit) captures the subject image to generate moving image data. The plurality of pieces of image data are a plurality of pieces of frame image data constituting the moving image data. With this configuration, in the first exemplary embodiment, the plurality of pieces of image data can be obtained in a short time, thereby shortening a time required for the synthesis processing.

4. Specific Examples in Automatic Setting of Main Subject

In the first exemplary embodiment, the main subject is set when the depth synthesis range is set. Further, in the first exemplary embodiment, when the main subject is set, the importance is calculated based on the area and the position of the subject, and the main subject is set based on the importance. Hereinafter, the setting of the main subject will be described using other specific examples.

Figure 22A:
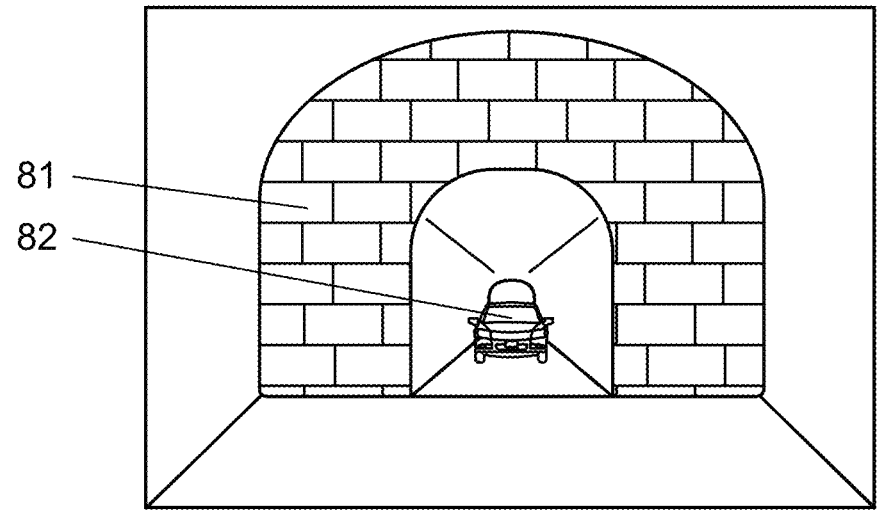
FIG. 22A is a view illustrating an example of a frame image including a plurality of subjects that have different areas from each other.
Figure 22B:
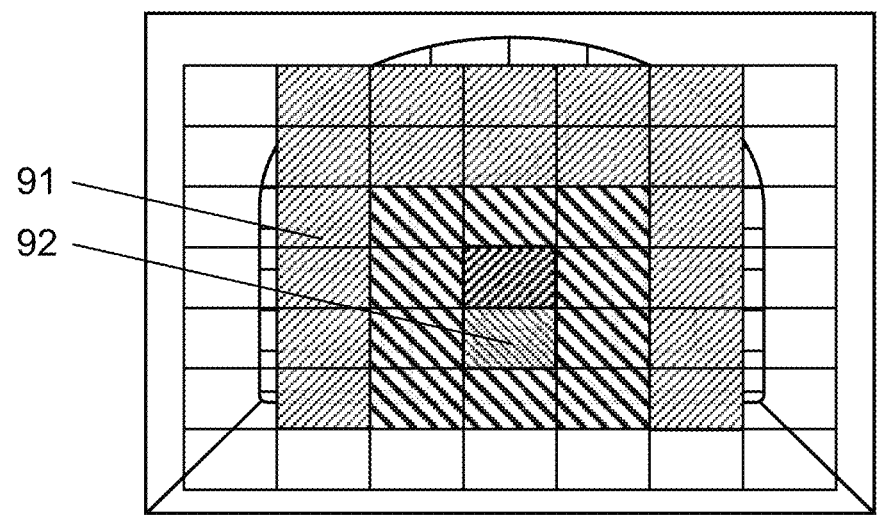
FIG. 22B is a view in which frames indicating the AF regions are superimposed on the frame image in FIG. 22A.

FIG. 22A is a view illustrating an example of a frame image including a plurality of subjects. Areas of these subjects in the image are different from each other. FIG. 22B is a view in which frames indicating the AF regions are superimposed on the frame image in FIG. 22A.

In FIG. 22A, tunnel 81 and vehicle 82 are disposed as the subjects in the image. In the image, an area of tunnel 81 is larger than an area of vehicle 82. For example, as illustrated in FIG. 22B, the area of tunnel 81 corresponds to a size of region 91, and includes 18 AF regions. The area of vehicle 82 corresponds to a size of region 92, and includes one AF region. In the image, in-focus positions of tunnel 81 and vehicle 82 are sufficiently different from each other. The sufficiently different in-focus positions mean that the subjects are spaced apart from each other by a range equal to or more than a predetermined range in which a synthesis image is collapsed. The in-focus position of tunnel 81 is closer to the nearest end, and the in-focus position of vehicle 82 is closer to the infinity end. Further, both center positions of tunnel 81 and vehicle 82 in the image are located at the center of the image, and are the same.

When the image in FIG. 22A as described above is captured, digital camera 100 of the first exemplary embodiment sets tunnel 81 that has the larger area in the image as the main subject. The depth synthesis range is then set centered around tunnel 81.

Figure 23A:
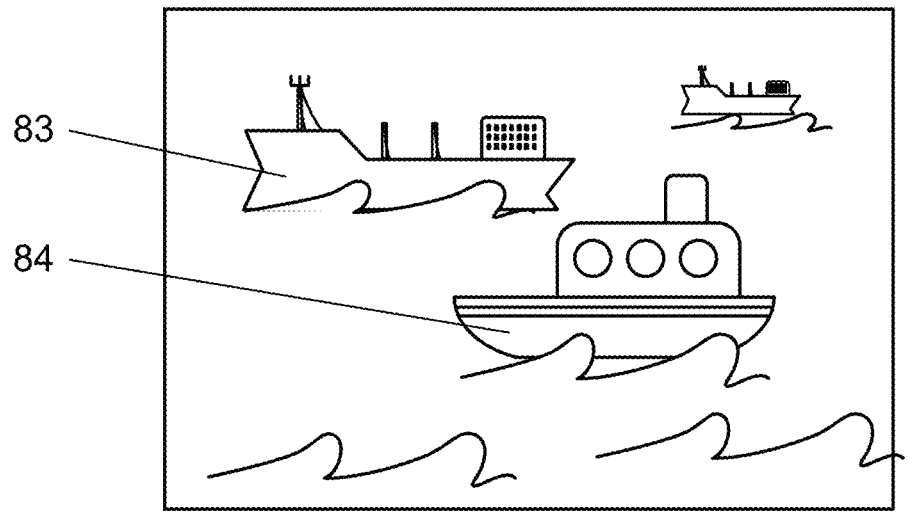
FIG. 23A is a view illustrating an example of a frame image including a plurality of subjects that have different center positions from each other.
Figure 23B:
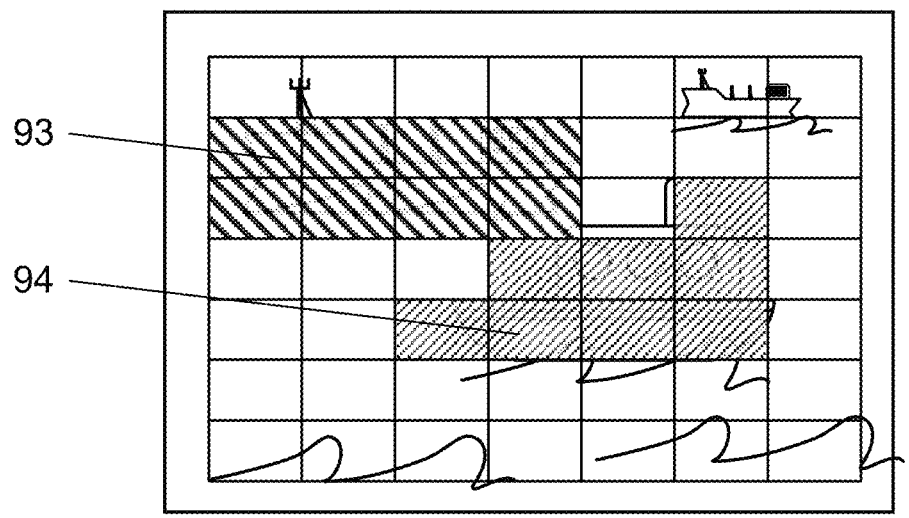
FIG. 23B is a view in which the frames indicating the AF regions are superimposed on the frame image in FIG. 23A.

FIG. 23A is a view illustrating an example of a frame image including a plurality of subjects that have different center positions from each other. FIG. 23B is a view in which frames indicating the AF regions are superimposed on the frame image in FIG. 23A.

In FIG. 23A, large sized ship 83 and small sized ship 84 are disposed as the subjects in the image. An area of large sized ship 83 in the image is equal to that of small sized ship 84 in the image. For example, as illustrated in FIG. 23B, the area of large sized ship 83 corresponds to a size of region 93, and includes eight AF regions. The area of small sized ship 84 corresponds to a size of region 94, and includes eight AF regions. Further, in the image, in-focus positions of large sized ship 83 and small sized ship 84 are sufficiently different from each other. As described above, the sufficiently different focus positions mean that the subjects are spaced apart from each other by a range equal to or more than a predetermined range in which the synthesis image is collapsed. Further, center positions of large sized ship 83 and small sized ship 84 in the image are different from each other. Large sized ship 83 is located at the left end in the image, and small sized ship 84 is located at a position closer to the center of the image than large sized ship 83 is.

When the image in FIG. 23A is captured, digital camera 100 of the first exemplary embodiment sets small sized ship 84 whose center position in the image is located closer to the center in the image as the main subject. The depth synthesis range is then set centered around small sized ship 84.

As described above, when the digital camera (an example of the imaging apparatus) of the first exemplary embodiment is expressed in another aspect, the digital camera synthesizes the plurality of pieces of image data and generates the still image data such that a depth of field of a main subject in the still image data is deeper than a depth of field of a main subject in each of the plurality of pieces of image data. In each image in the plurality of pieces of image data, in a case where a first subject and a second subject are disposed, when areas of the first subject and the second subject in the image are different from each other, in-focus positions of the first subject and the second subject are different from each other, and center positions of the first subject and the second subject in the image are equal to each other, the digital camera sets one of the first subject and the second subject having a larger area in the image as the main subject. Further, in each image in the plurality of pieces of image data, in a case where the first subject and the second subject are disposed, when the areas of the first subject and the second subject in the image are equal to each other, the in-focus positions of the first subject and the second subject are different from each other, and the center positions of the first subject and the second subject in the image are different from each other, the digital camera sets one of the first subject and the second subject that is closer to the center of the image as the main subject.

When automatically setting the depth synthesis range, digital camera 100 of the first exemplary embodiment can set the synthesis range centered around the subject that is considered more important by the user. Therefore, an image having a deeper depth of field, which is desired by the user, can be easily obtained.

Other Exemplary Embodiments

As described above, the first exemplary embodiment has been described to exemplify a technique disclosed in the present application. However, the technique in the present disclosure is not limited to the first exemplary embodiment, and can also be applied to an exemplary embodiment in which modification, replacement, addition, omission, or the like is made appropriately. In addition, a new exemplary embodiment can be made by combining constituents described in the first exemplary embodiment. Therefore, other exemplary embodiments will be described below.

(1) In the first exemplary embodiment, the depth synthesis is performed by using the frame images that constitute the multifocus moving image. However, the depth synthesis may be performed by using a plurality of still images generated through continuous shooting instead of the frame images that constitute the moving image.

(2) In the first exemplary embodiment, the importance (accumulated importance) of the subject is set based on both the area and the position of the subject in the image. However, the importance may be set based on any one of the area and the position of the subject. Alternatively, in addition to or instead of the area and the position of the subject in the image, the importance may be set based on other conditions. For example, the importance may be set according to a type of the subject. More specifically, when the subject is a face of a person, the importance may be set higher, and otherwise, the importance may be set lower. Further, the importance may be set according to an in-focus position of the subject. More specifically, the importance of the subject focused at a position closest to the nearest end may be set higher. Further, in the first exemplary embodiment, the center of the main subject is set as the center of the depth synthesis range, but the center of the main subject may be set as a start point or an end point of the depth synthesis range. For example, the depth synthesis range may be determined by setting an in-focus position closest to the nearest end as the start point.

(3) The idea disclosed in the first exemplary embodiment is applicable to both types of digital cameras with interchangeable lenses and digital cameras with built-in lenses.

(4) In the first exemplary embodiment, the digital camera has been described as an example of an imaging apparatus. However, the imaging apparatus is not limited to this. The idea of the present disclosure is applicable to various imaging apparatuses such as digital video cameras, smartphones, and wearable cameras which can shoot moving images.

(5) In the exemplary embodiments described above, an imaging device as an imaging unit is configured as a CCD, but the imaging device is not limited to this. The imaging device may be configured as an n-channel metal-oxide semiconductor (NMOS) image sensor or a complementary metal oxide semiconductor (CMOS) image sensor.

As described above, the exemplary embodiments have been described to exemplify the technique disclosed in the present disclosure. For this reason, accompanying drawings and detailed description are provided. Therefore, the components described in the accompanying drawings and the detailed description include not only the components essential for solving the problem but also components that are not essential for solving the problem in order to illustrate the techniques. For this reason, even if these unessential components are described in the accompanying drawings and the detailed description, these unessential components should not be immediately approved as being essential. Further, since the above-described exemplary embodiments illustrate the technique in the present disclosure, various modifications, substitutions, additions, and omissions can be made within the scope of claims and equivalent scope of claims.

The present disclosure is applicable to an imaging apparatus which can shoot moving images. Specifically, the present disclosure is applicable to various imaging apparatuses such as digital cameras, digital video cameras, smartphones, and wearable cameras that can shoot moving images.

What is claimed is:

1. An imaging apparatus comprising:
   an imaging unit that captures a subject image while changing an in-focus position to generate a plurality of pieces of image data;
   an image processor that synthesizes the plurality of pieces of image data generated by the imaging unit to generate still image data having a deeper depth of field than a depth of field of each of the plurality of pieces of image data; and
   a controller that controls the image processor,
   wherein the controller causes the image processor to detect a main subject from an image indicated by one image data in the plurality of pieces of image data, determine a range for synthesizing the plurality of pieces of image data based on a position of the detected main subject, and synthesize pieces of image data focused within the determined range in the plurality of pieces of image data to generate the still image data,
   the controller calculates importance of each of a plurality of subjects included in the image, and sets the main subject from the plurality of subjects based on the calculated importance, and
   the importance is set to a larger value as an area of each of the plurality of subjects in the image is larger.

2. The imaging apparatus according to claim 1, wherein the controller identifies the image by dividing the image into a plurality of regions, and when a difference between the in-focus positions in a first region and a second region that are adjacent to each other in the plurality of regions is equal to or less than a predetermined value, the controller determines that the first region and the second region include at least one identical subject in the plurality of subjects.

3. The imaging apparatus according to claim 2, wherein the predetermined value is set so as to be different according to the in-focus position.

4. The imaging apparatus according to claim 1, wherein the imaging unit captures the subject image to generate moving image data, and
   the plurality of pieces of image data is a plurality of pieces of frame image data constituting the moving image data.

5. An imaging apparatus comprising:
   an imaging unit that captures a subject image while changing an in-focus position to generate a plurality of pieces of image data;
   an image processor that synthesizes the plurality of pieces of image data generated by the imaging unit to generate still image data having a deeper depth of field than a depth of field of each of the plurality of pieces of image data; and
   a controller that controls the image processor,
   wherein the controller causes the image processor to detect a main subject from an image indicated by one image data in the plurality of pieces of image data, determine a range for synthesizing the plurality of pieces of image data based on a position of the detected main subject, and synthesize pieces of image data focused within the determined range in the plurality of pieces of image data to generate the still image data,
   the controller calculates importance of each of a plurality of subjects included in the image, and sets the main subject from the plurality of subjects based on the calculated importance, and
   the importance is set to a larger value as a position of each of the plurality of subjects is closer to a center of the image.

6. The imaging apparatus according to claim 5, wherein the controller identifies the image by dividing the image into a plurality of regions, and when a difference between the in-focus positions in a first region and a second region that are adjacent to each other in the plurality of regions is equal to or less than a predetermined value, the controller determines that the first region and the second region include at least one identical subject in the plurality of subjects.

7. The imaging apparatus according to claim 6, wherein the predetermined value is set so as to be different according to the in-focus position.

8. The imaging apparatus according to claim 5, wherein the imaging unit captures the subject image to generate moving image data, and
   the plurality of pieces of image data is a plurality of pieces of frame image data constituting the moving image data.

9. An imaging apparatus comprising:
   an imaging unit that captures a subject image while changing an in-focus position to generate a plurality of pieces of image data;
   an image processor that synthesizes the plurality of pieces of image data generated by the imaging unit to generate still image data having a deeper depth of field than a depth of field of each of the plurality of pieces of image data; and
   a controller that controls the image processor,
   wherein the controller causes the image processor to detect a main subject from an image indicated by one image data in the plurality of pieces of image data, determine a range for synthesizing the plurality of pieces of image data based on a position of the detected main subject, and synthesize pieces of image data focused within the determined range in the plurality of pieces of image data to generate the still image data, and
   wherein, when causing the image processor to detect the main subject, the controller causes the image processor to use information in which information for identifying each of the plurality of pieces of image data, information indicating a focused region in each of the plurality of pieces of image data, and the in-focus position in generating each of the plurality of pieces of image data are associated with each other.

10. An image synthesis method comprising synthesizing a plurality of pieces of image data to generate still image data such that a depth of field of a main subject in the still image data is deeper than a depth of field of the main subject in each of the plurality of pieces of image data,
    wherein in a case where a first subject and a second subject are disposed in each image of the plurality of pieces of image data,
    when areas of the first subject and the second subject in the image are different from each other, in-focus positions of the first subject and the second subject are different from each other, and center positions of the first subject and the second subject in the image are equal to each other, one of the first subject and the second subject having a larger area in the image is set as the main subject, and when the areas of the first subject and the second subject in the image are equal to each other, the in-focus positions of the first subject and the second subject are different from each other, and the center positions of the first subject and the second subject in the image are different from each other, one of the first subject and the second subject closer to a center of the image is set as the main subject.

* * * * *